(12) United States Patent
Pichler et al.

(10) Patent No.: US 10,738,690 B2
(45) Date of Patent: Aug. 11, 2020

(54) CONNECTING ROD HAVING AN ADJUSTABLE CONNECTING ROD LENGTH WITH A MECHANICAL ACTUATING MEANS

(71) Applicants: AVL LIST GMBH, Graz (AT); IWIS MOTORSYSTEME GMBH & CO. KG, Munich (DE)

(72) Inventors: Juergen Pichler, Graz (AT); Andreas Krobath, Graz (AT); Johann Felgitscher, Allerheiligen (AT); Thomas Weberbauer, Graz (AT); Siegfried Loesch, Sankt Stefan ob Leoben (AT)

(73) Assignees: AVL LIST GMBH, Graz (AT); IWIS MOTORSYSTEME GMBH & CO. KG, Munich (DE)

( * ) Notice: Subject to any disclaimer, the term of this patent is extended or adjusted under 35 U.S.C. 154(b) by 0 days.

(21) Appl. No.: 16/315,236

(22) PCT Filed: Jul. 6, 2017

(86) PCT No.: PCT/EP2017/066959
§ 371 (c)(1),
(2) Date: Apr. 19, 2019

(87) PCT Pub. No.: WO2018/007534
PCT Pub. Date: Jan. 11, 2018

(65) Prior Publication Data
US 2019/0242300 A1 Aug. 8, 2019

(30) Foreign Application Priority Data
Jul. 6, 2016 (DE) .................. 10 2016 008 306
Aug. 23, 2016 (AT) ................... 50757/2016

(51) Int. Cl.
F02B 75/04 (2006.01)
F16C 7/06 (2006.01)
F16C 7/04 (2006.01)

(52) U.S. Cl.
CPC .............. *F02B 75/045* (2013.01); *F16C 7/06* (2013.01); *F16C 7/04* (2013.01); *F16C 2360/22* (2013.01)

(58) Field of Classification Search
CPC ......... F02B 75/045; F02B 75/044; F16C 7/06
(Continued)

(56) References Cited

U.S. PATENT DOCUMENTS 988,344 A  4/1911  Holzmueller
1,610,137 A  12/1926  Kratsch
(Continued)

FOREIGN PATENT DOCUMENTS

AT  511803  3/2013
AT  512334  7/2013
(Continued)

OTHER PUBLICATIONS

Official Action for German Patent Application No. 102016008306. 9, dated May 23, 2017, 9 pages.
(Continued)

*Primary Examiner* — Long T Tran
*Assistant Examiner* — James J Kim
(74) *Attorney, Agent, or Firm* — Sheridan Ross P.C.

(57) ABSTRACT

Adjustable-length connecting rod (100, 200) for a reciprocating piston engine, in particular for a reciprocating piston internal combustion engine, having a hydraulic cylinder for adjusting an effective connecting rod length (L) of the connecting rod (100, 200), which hydraulic cylinder has at least one piston and a first hydraulic operating chamber (21) and a second hydraulic operating chamber (22), a hydrau-
(Continued)

Figure 1G:
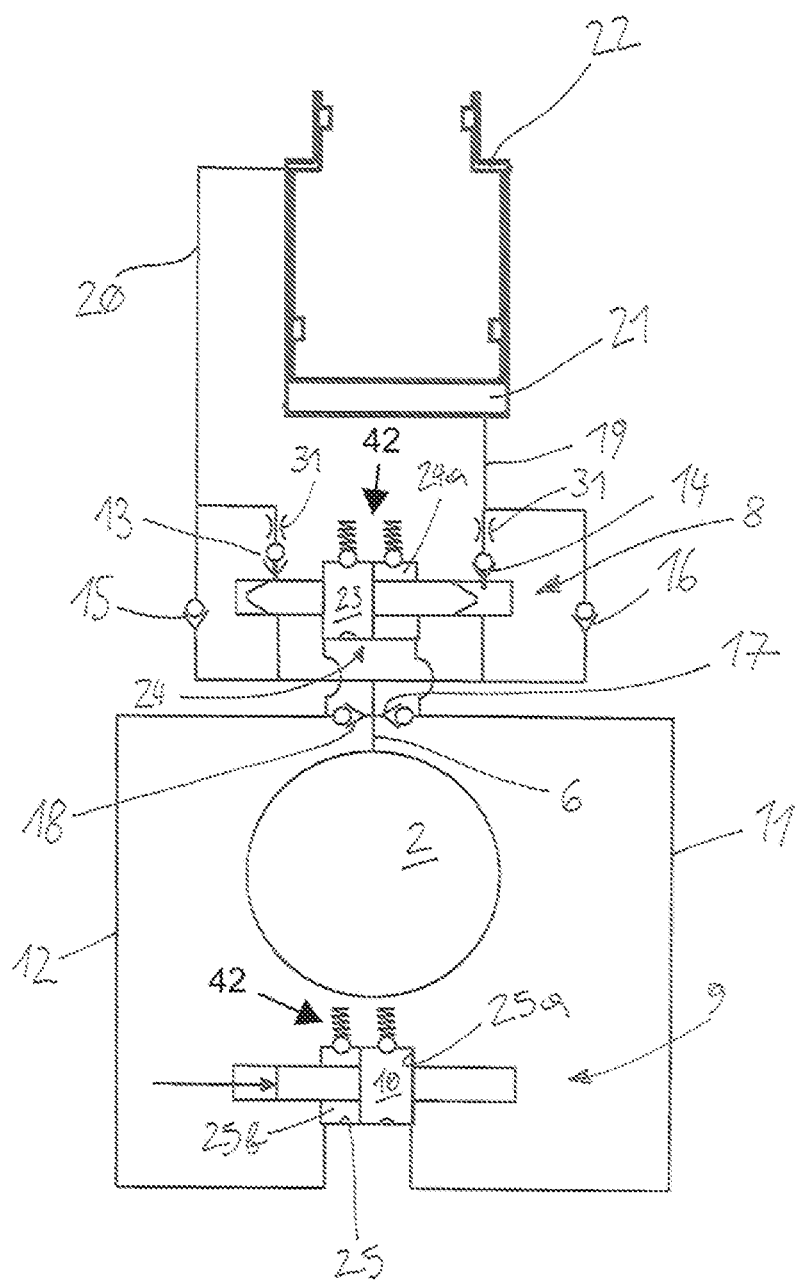

lically actuable control device (8) which can be switched over at least between two switching states with an actuating piston (23) for controlling the adjustment of the connecting rod (100, 200), and a mechanically actuable actuating device (9) for switching the control device (8), which actuating device (9) is operatively connected via at least one hydraulic actuating line (11, 12) to the actuating piston (23) of the control device (8) for actuating it hydraulically.

25 Claims, 19 Drawing Sheets

(58) Field of Classification Search
USPC .......................................................... 123/48 B
See application file for complete search history.

(56) References Cited

U.S. PATENT DOCUMENTS

| | | | |
|---|---|---|---|
| 2,033,601 A | 3/1936 | Wohanka | |
| 2,134,995 A | 11/1938 | Anderson | |
| 2,217,721 A | 10/1940 | Anthony | |
| 2,252,153 A | 8/1941 | Anthony | |
| 2,778,378 A | 1/1957 | Presnell | |
| 2,989,954 A | 6/1961 | Hulbert | |
| 3,171,334 A | 3/1965 | Rasmussen | |
| 4,124,002 A | 11/1978 | Crise | |
| 4,140,091 A | 2/1979 | Showers, Jr. | |
| 4,195,601 A | 4/1980 | Crise | |
| 4,370,901 A | 2/1983 | Bolen | |
| 4,406,256 A | 9/1983 | Akkerman | |
| 5,178,103 A | 1/1993 | Simko | |
| 5,562,068 A | 10/1996 | Sugimoto et al. | |
| 5,724,863 A | 3/1998 | Kramer et al. | |
| 5,960,750 A * | 10/1999 | Kreuter | F02B 75/045 |
| | | | 123/48 B |
| 6,394,048 B1 | 5/2002 | Styron | |
| 6,604,496 B2 | 8/2003 | Bartsch et al. | |
| 8,746,188 B2 * | 6/2014 | Wilkins | F02B 75/044 |
| | | | 123/48 A |
| 9,528,546 B2 * | 12/2016 | Melde-Tuczai | F02B 75/045 |
| 9,617,911 B2 * | 4/2017 | Paul | F02B 75/045 |
| 9,670,952 B2 | 6/2017 | Melde-Tuczai et al. | |
| 9,845,738 B2 | 12/2017 | Pluta | |
| 1,029,485 A1 | 5/2019 | Melde-Tuczai et al. | |
| 2004/0187634 A1 | 9/2004 | Meyer | |
| 2008/0115769 A1 | 5/2008 | Mason | |
| 2008/0251158 A1 | 10/2008 | Koch | |
| 2009/0107467 A1 | 4/2009 | Berger | |
| 2009/0205615 A1 | 8/2009 | Cannata | |
| 2010/0132672 A1 | 6/2010 | Lee et al. | |
| 2010/0218746 A1 | 9/2010 | Rabhi | |
| 2013/0247879 A1 | 9/2013 | Von Mayenburg | |
| 2015/0152794 A1 | 6/2015 | Paul | |
| 2016/0177997 A1 * | 6/2016 | Ezaki | F16J 7/00 |
| | | | 123/48 B |
| 2016/0222880 A1 | 8/2016 | Velazquez | |
| 2016/0237889 A1 * | 8/2016 | Melde-Tuczai | F02B 75/045 |
| 2016/0305471 A1 | 10/2016 | Wittek | |
| 2016/0333780 A1 | 11/2016 | Kamo et al. | |
| 2018/0258846 A1 * | 9/2018 | Kamo | F02B 75/045 |
| 2018/0266313 A1 | 9/2018 | Melde-Tuczai et al. | |
| 2018/0363546 A1 | 12/2018 | Theissl | |
| 2018/0371988 A1 * | 12/2018 | Melde-Tuczai | F02B 75/045 |
| 2019/0234300 A1 | 8/2019 | Melde-Tuczai et al. | |

FOREIGN PATENT DOCUMENTS

| | | |
|---|---|---|
| AT | 514071 | 10/2014 |
| AT | 517100 | 11/2016 |
| AT | 517112 | 11/2016 |
| AT | 517217 | 12/2016 |
| AT | 517492 | 2/2017 |
| AT | 517619 | 3/2017 |
| AT | 517624 | 3/2017 |
| AT | 517718 | 4/2017 |
| CN | 102330561 | 1/2012 |
| CN | 103047409 | 4/2013 |
| CS | 229539 | 6/1984 |
| DE | 1205390 | 11/1965 |
| DE | 1287345 | 1/1969 |
| DE | 2161580 | 7/1973 |
| DE | 2414020 | 10/1975 |
| DE | 3149306 | 6/1983 |
| DE | 8429462 | 2/1985 |
| DE | 3507327 | 9/1986 |
| DE | 4026492 | 2/1992 |
| DE | 4133188 | 4/1992 |
| DE | 4226361 | 4/1994 |
| DE | 4315463 | 5/1994 |
| DE | 29608749 | 7/1996 |
| DE | 19612721 | 10/1996 |
| DE | 19703948 | 6/1998 |
| DE | 19835146 | 6/1999 |
| DE | 10213890 | 10/2002 |
| DE | 10201601 | 6/2003 |
| DE | 10230427 | 1/2004 |
| DE | 102005036701 | 2/2007 |
| DE | 102005055199 | 5/2007 |
| DE | 102007040699 | 3/2009 |
| DE | 102008038971 | 2/2010 |
| DE | 102010016037 | 9/2011 |
| DE | 102011104934 | 12/2012 |
| DE | 102012020999 | 1/2014 |
| DE | 102013210494 | 12/2014 |
| DE | 102013111617 | 4/2015 |
| DE | 102013113432 | 6/2015 |
| DE | 102014200162 | 7/2015 |
| DE | 102014004987 | 10/2015 |
| DE | 102015001066 | 10/2015 |
| DE | 102014220177 | 5/2016 |
| EP | 0438121 | 7/1991 |
| EP | 1065393 | 1/2001 |
| EP | 2280198 | 2/2011 |
| FR | 2857408 | 1/2005 |
| FR | 2889864 | 2/2007 |
| GB | 161580 | 7/1922 |
| GB | 898268 | 6/1962 |
| GB | 2161580 | 1/1986 |
| JP | S52-9703 | 1/1977 |
| JP | S58-165543 | 9/1983 |
| JP | S61-24804 | 2/1986 |
| JP | 2003-129817 | 5/2003 |
| JP | 2005-267420 | 9/2005 |
| JP | 2010-112286 | 5/2010 |
| JP | 2010-112448 | 5/2010 |
| NL | 7602119 | 9/1977 |
| RU | 2226626 | 4/2004 |
| SU | 1008523 | 3/1983 |
| WO | WO 96/01943 | 1/1996 |
| WO | WO 02/10568 | 2/2002 |
| WO | WO 2012/113349 | 8/2012 |
| WO | WO 2013/092364 | 6/2013 |
| WO | WO 2014/005984 | 1/2014 |
| WO | WO 2014/019684 | 2/2014 |
| WO | WO 2014/188060 | 11/2014 |
| WO | WO 2015/055582 | 4/2015 |
| WO | WO 2015/082722 | 6/2015 |
| WO | WO 2015/172168 | 11/2015 |
| WO | WO 2015/193437 | 12/2015 |
| WO | WO 2016/042605 | 3/2016 |
| WO | WO 2016/083592 | 6/2016 |
| WO | WO 2016/103554 | 6/2016 |
| WO | WO 2016/203047 | 12/2016 |
| WO | WO 2017/001229 | 1/2017 |
| WO | WO 2017/025580 | 2/2017 |

OTHER PUBLICATIONS

Official Action for Austria Patent Application No. A 50757/2016, dated Jun. 8, 2017, 5 pages.

(56) References Cited

OTHER PUBLICATIONS

Official Action for Austria Patent Application No. A 50757/2016, dated Oct. 25, 2017, 3 pages.
Official Action for Austria Patent Application No. 50757/2016, dated Mar. 16, 2018, 3 pages.
International Search Report prepared by the European Patent Office dated Sep. 22, 2017, for International Application No. PCT/EP2017/066959.
U.S. Appl. No. 15/737,423, filed Apr. 30, 2018.
U.S. Appl. No. 16/062,217, filed Jun. 14, 2018.
U.S. Appl. No. 16/062,238, filed Jun. 14, 2018.
U.S. Appl. No. 15/028,638, filed Apr. 11, 2016 now U.S. Pat. No. 10,294,859.
U.S. Appl. No. 16/306,007, filed Nov. 30, 2018.
U.S. Appl. No. 16/306,028, filed Apr. 12, 2019.
U.S. Appl. No. 16/338,071, filed Mar. 29, 2019.
U.S. Appl. No. 16/487,585, filed Aug. 21, 2019.

\* cited by examiner

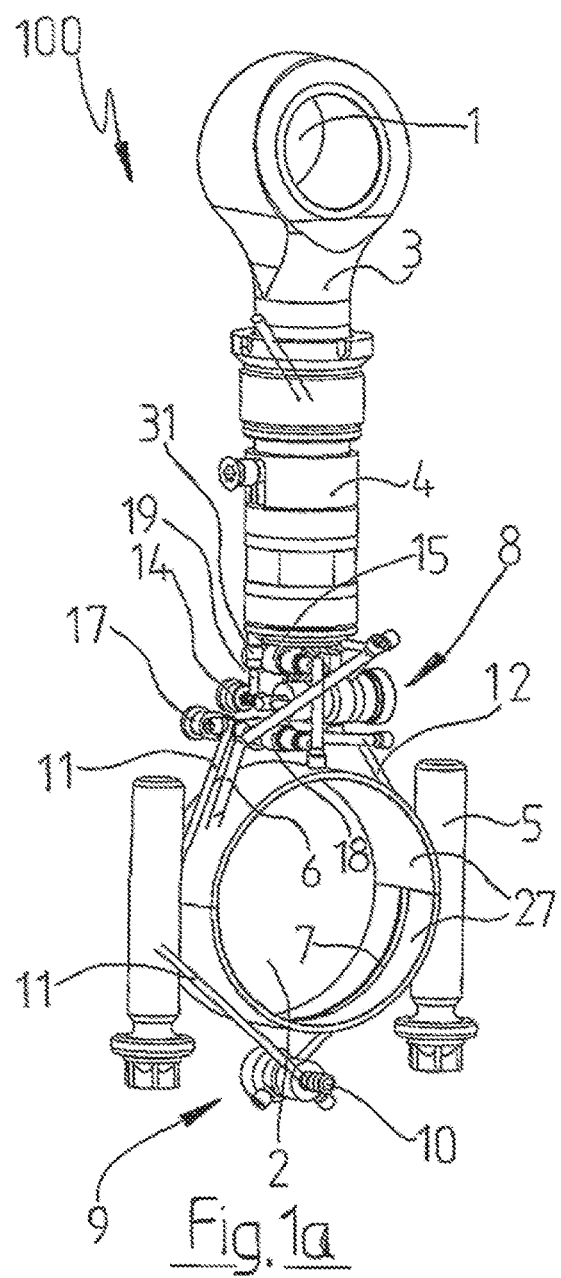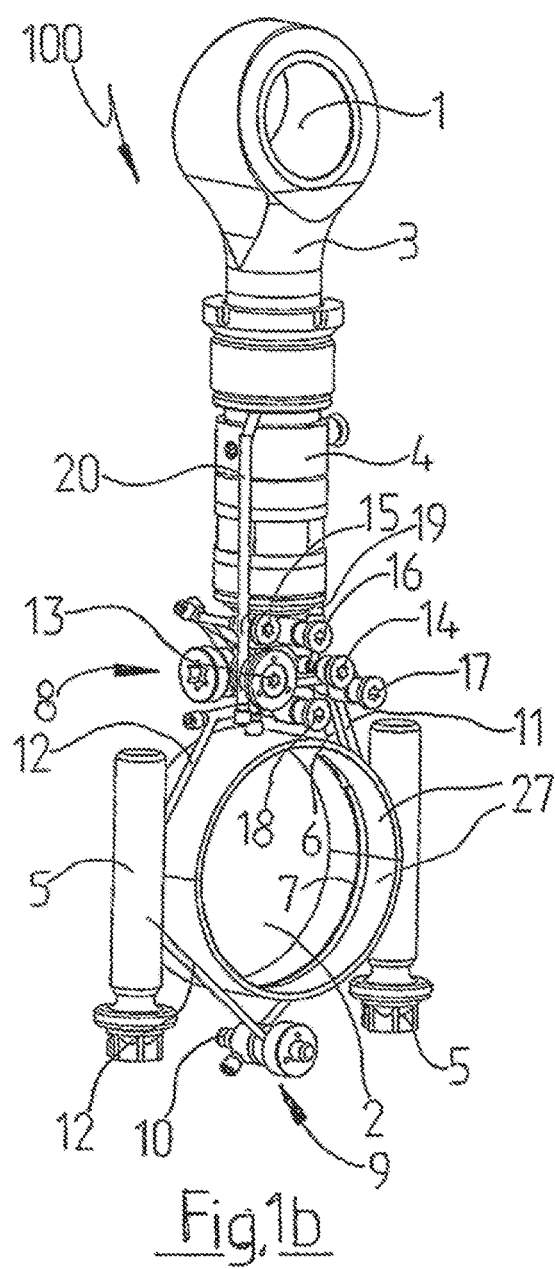

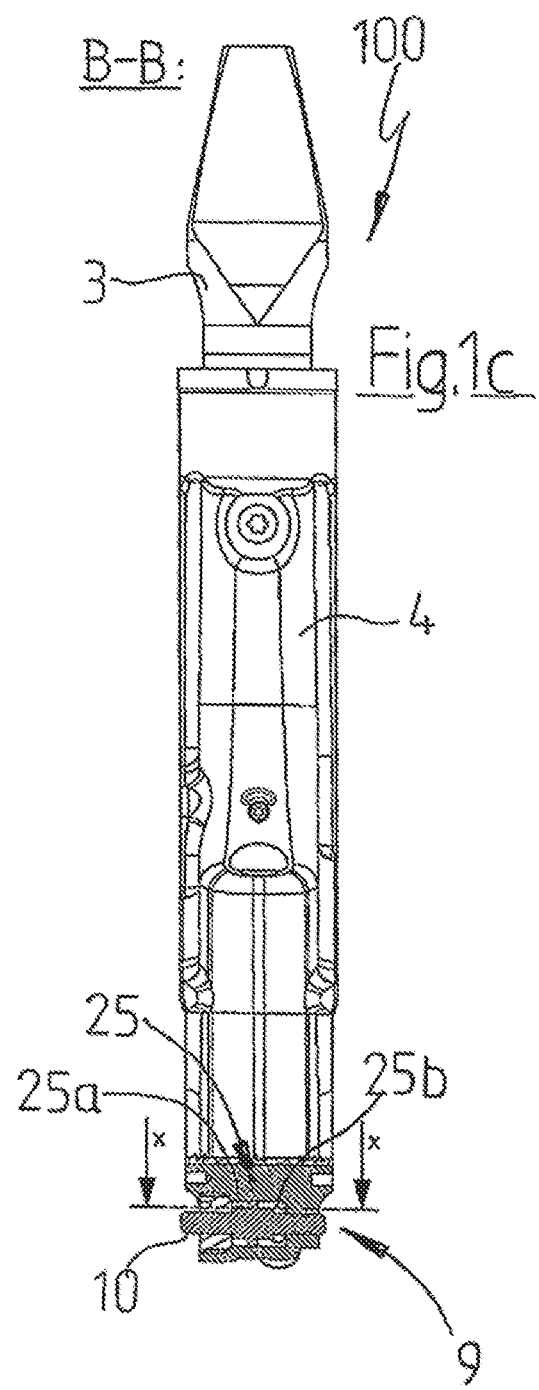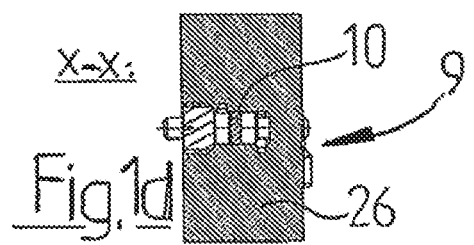

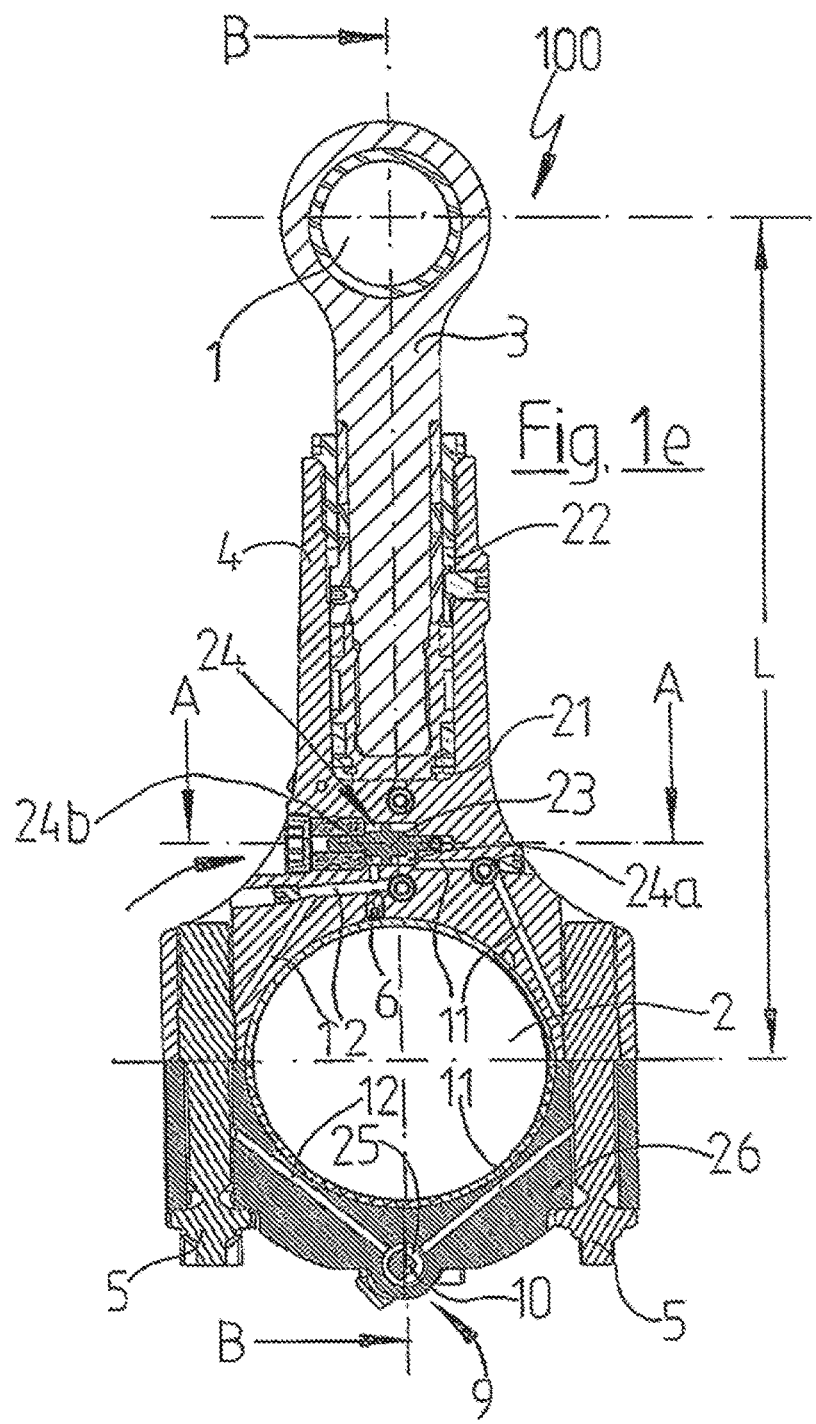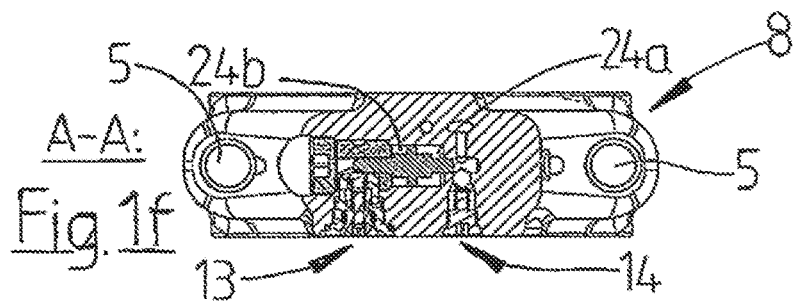

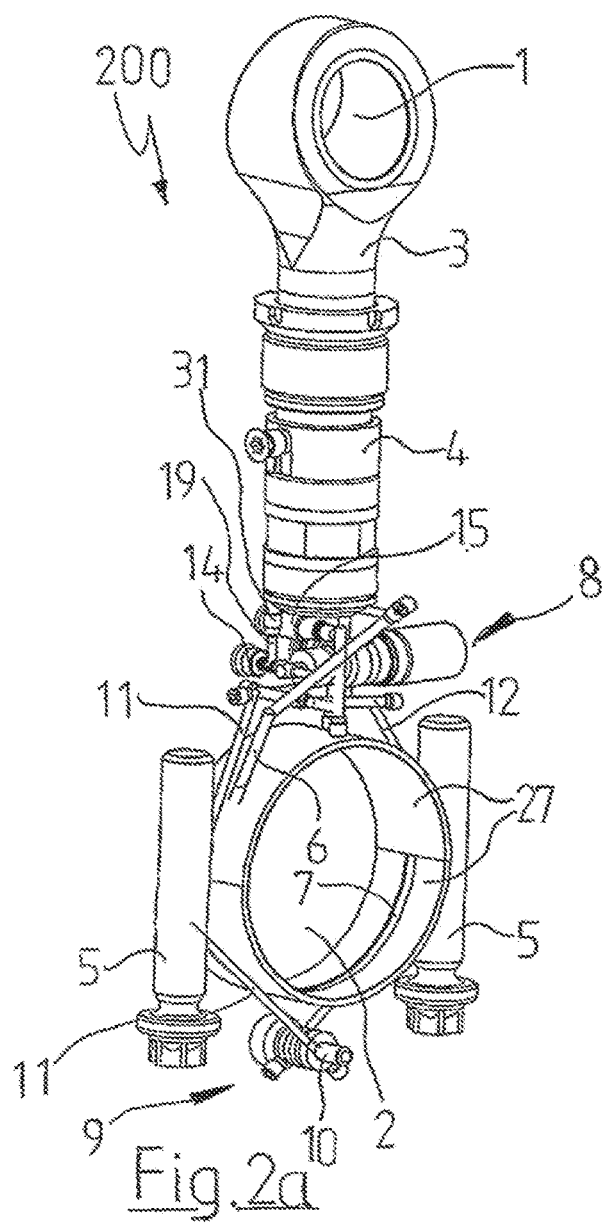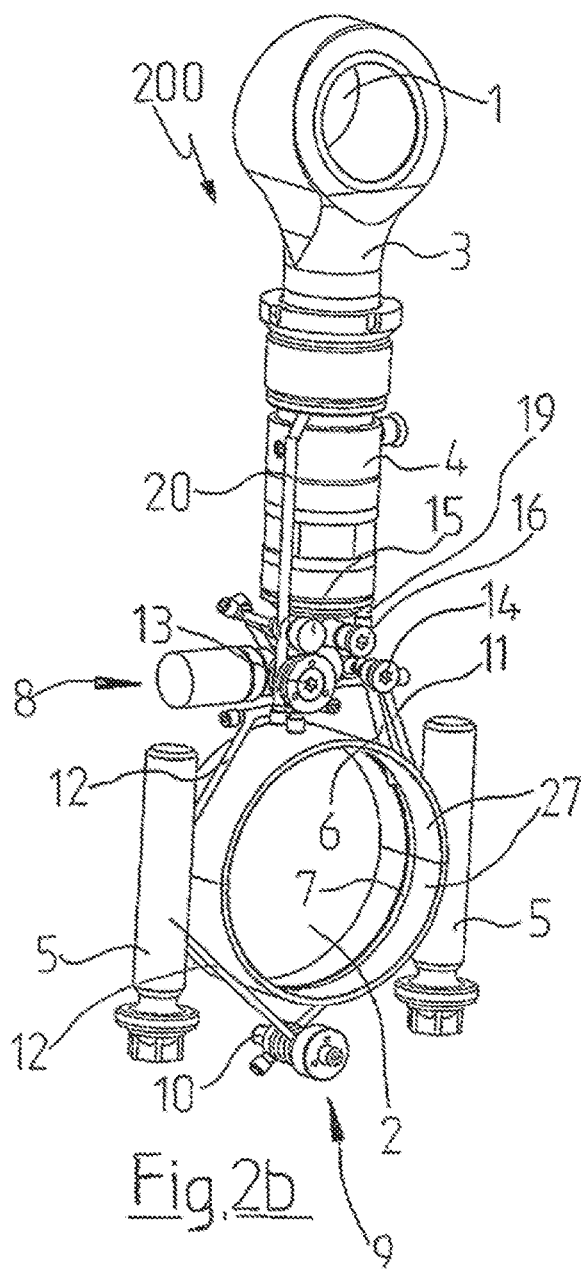

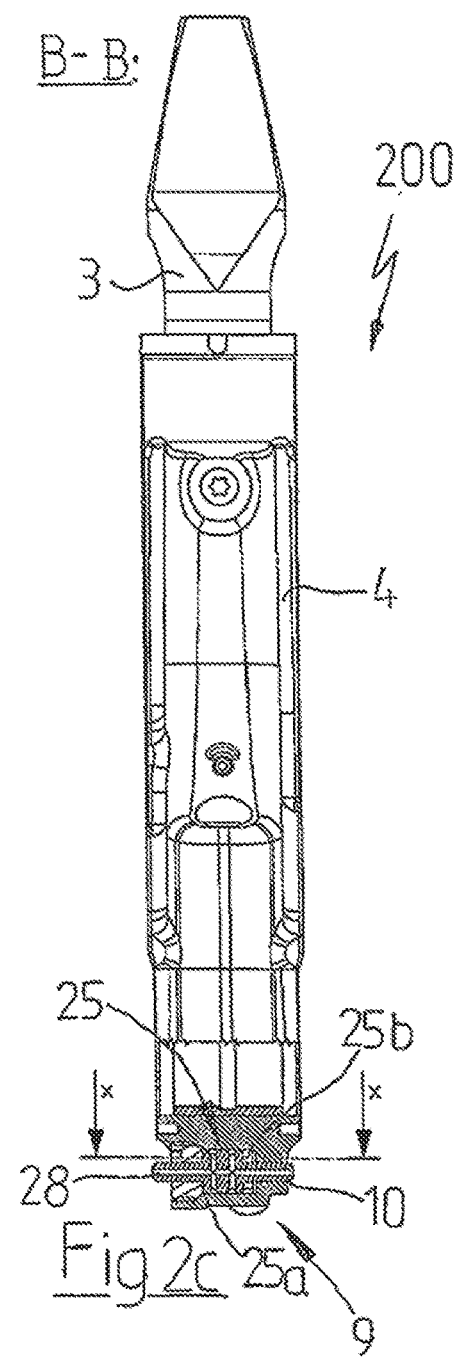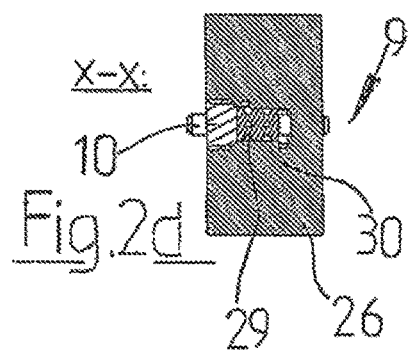

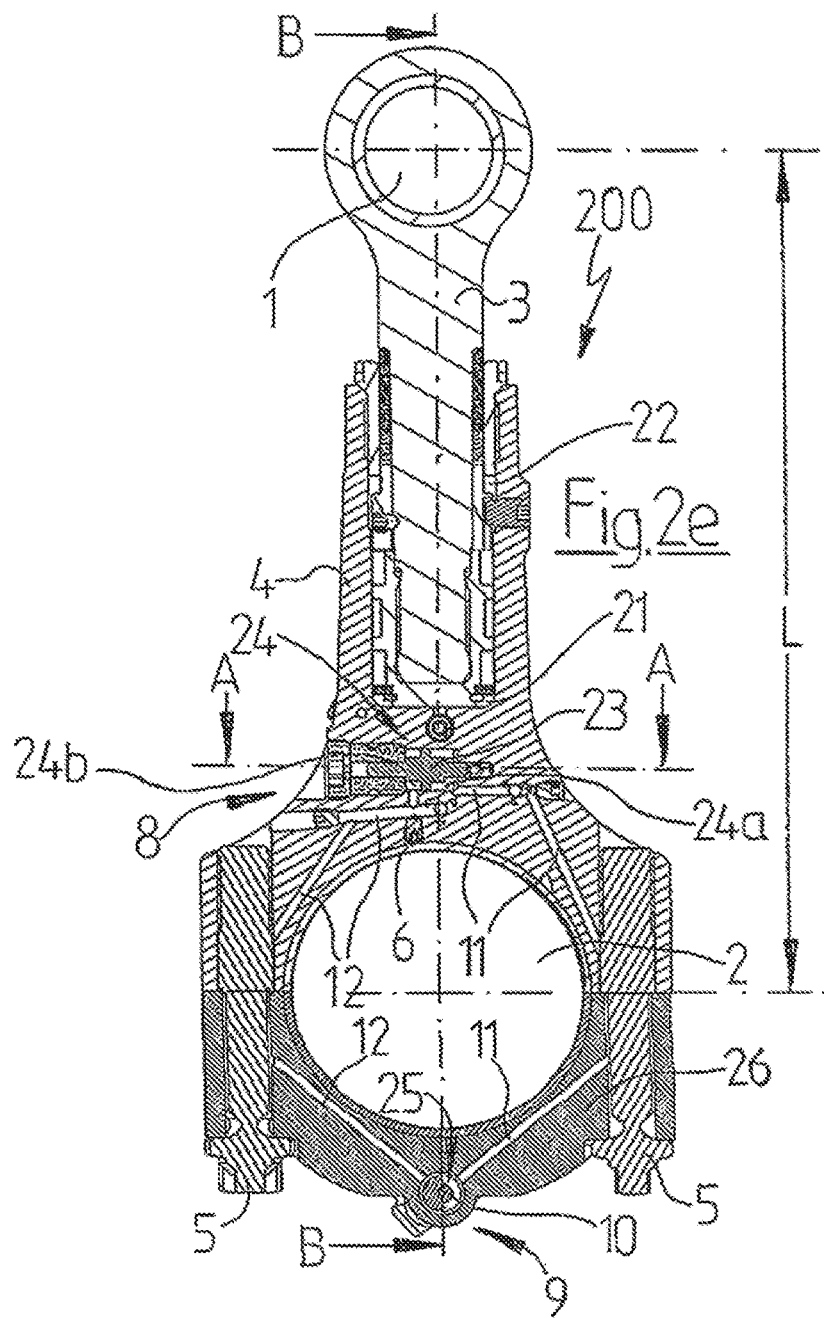
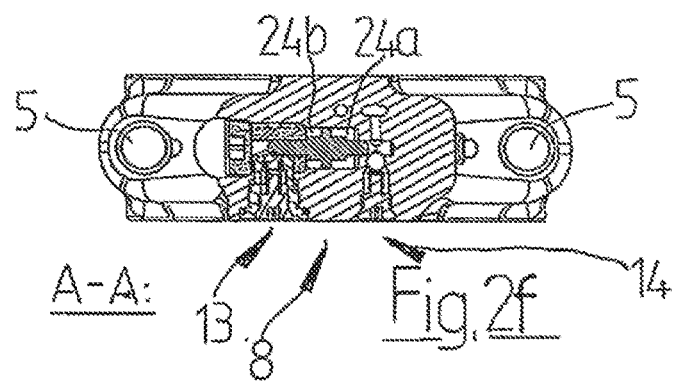

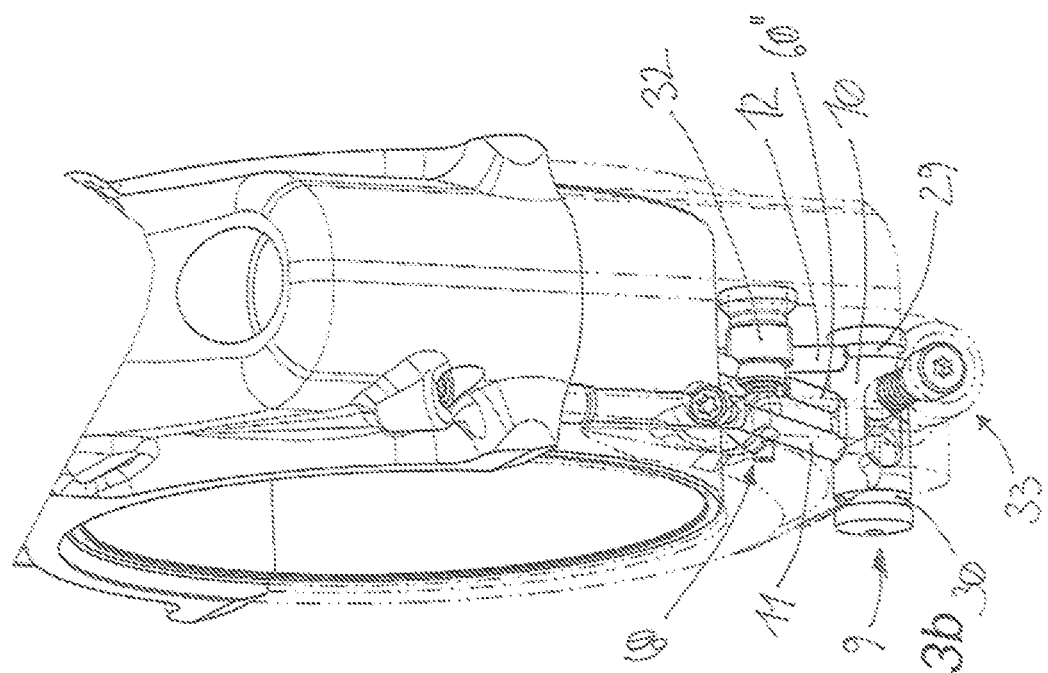

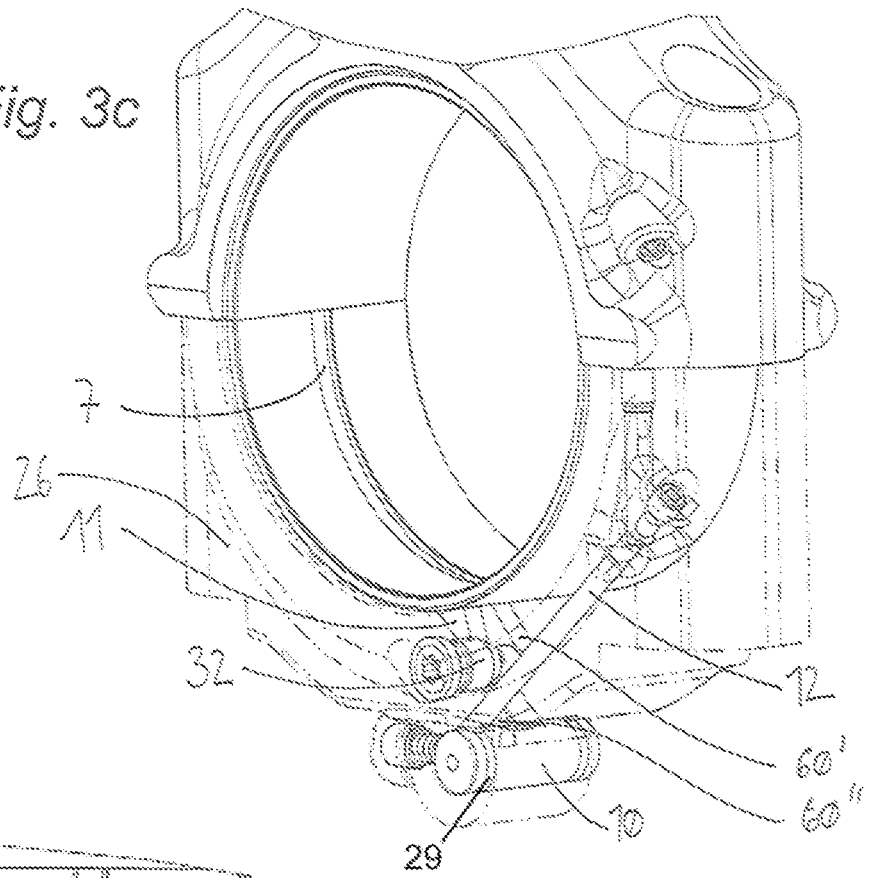
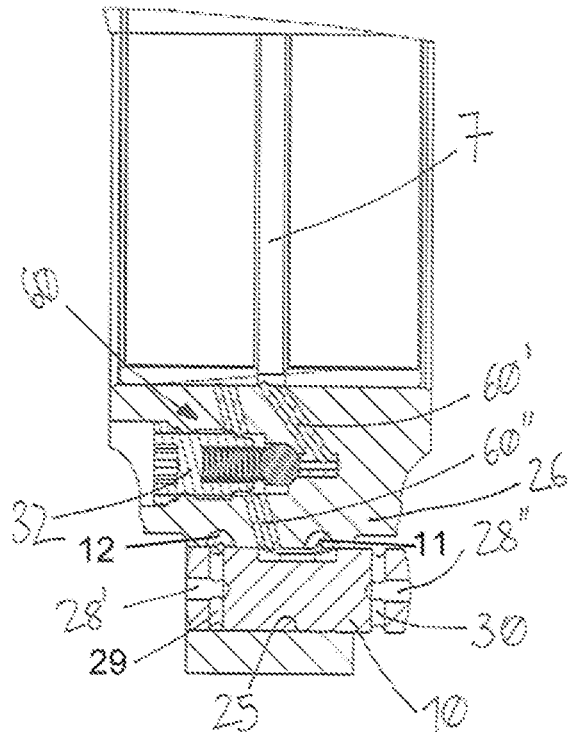
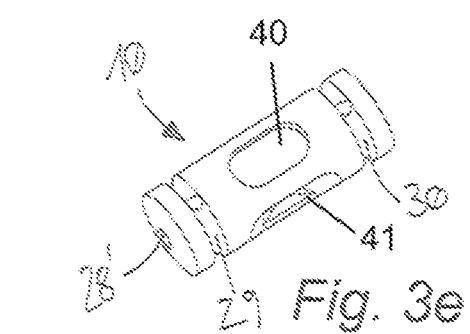
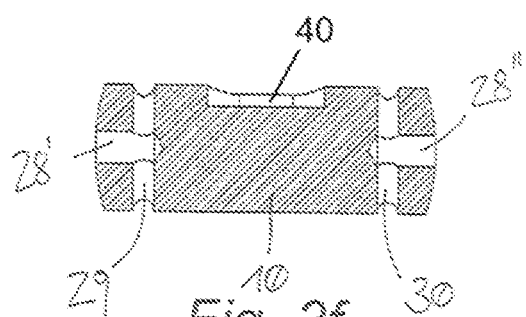

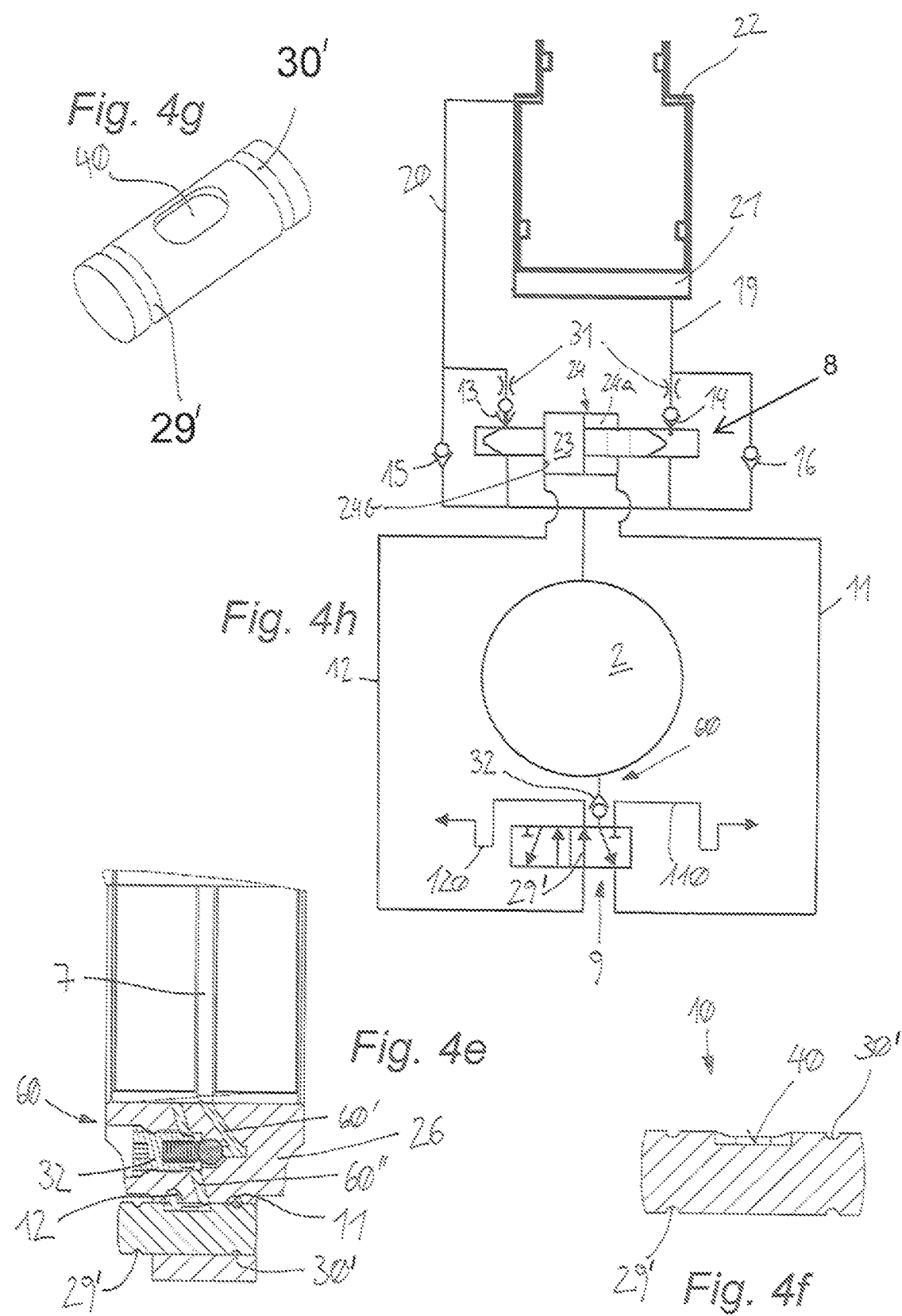

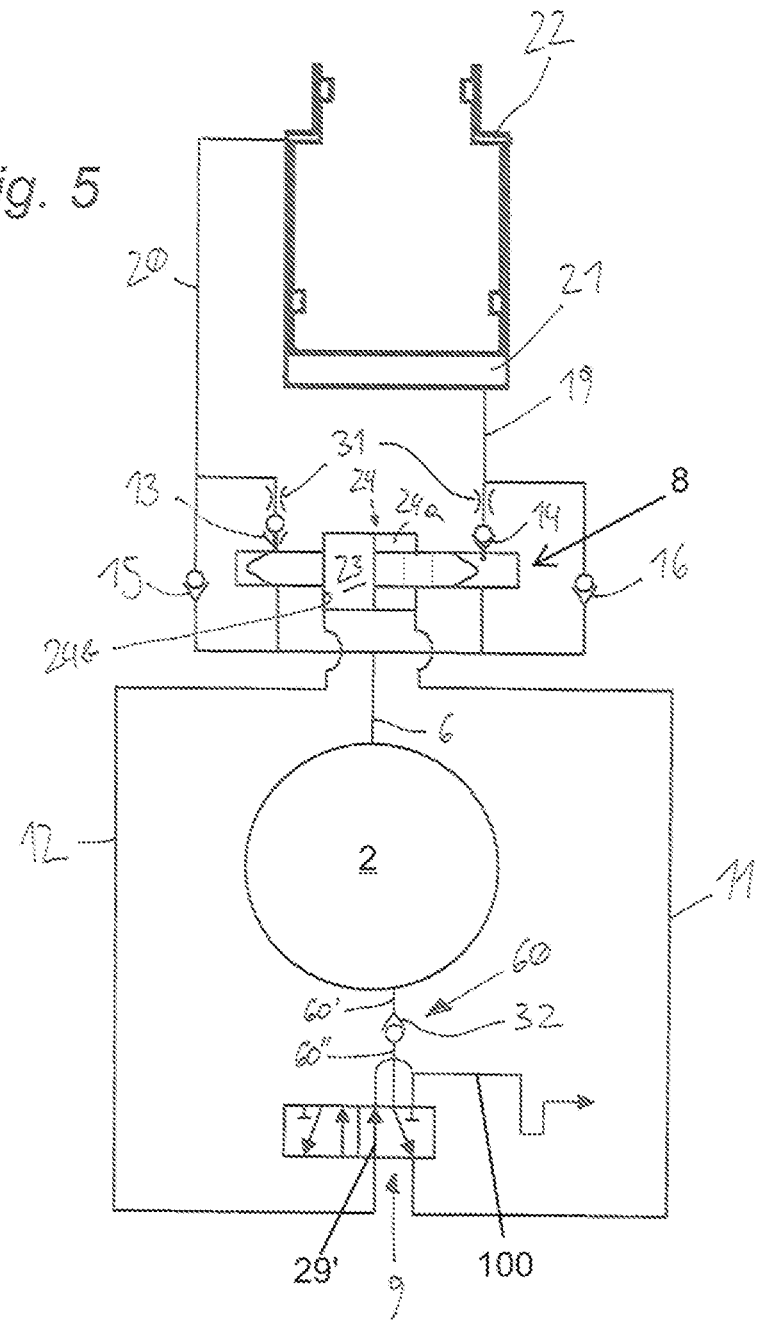

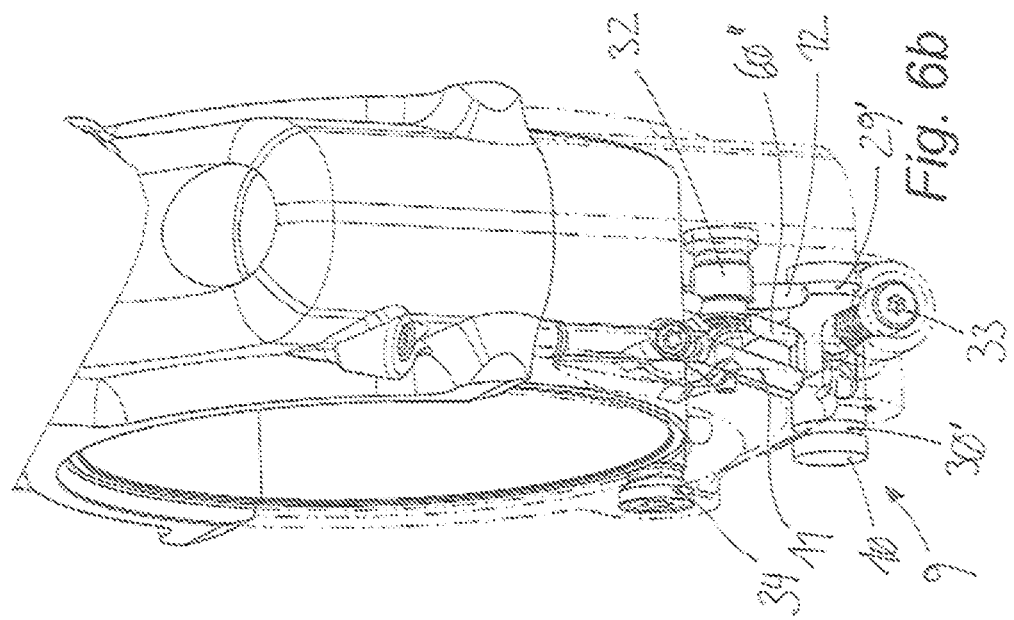
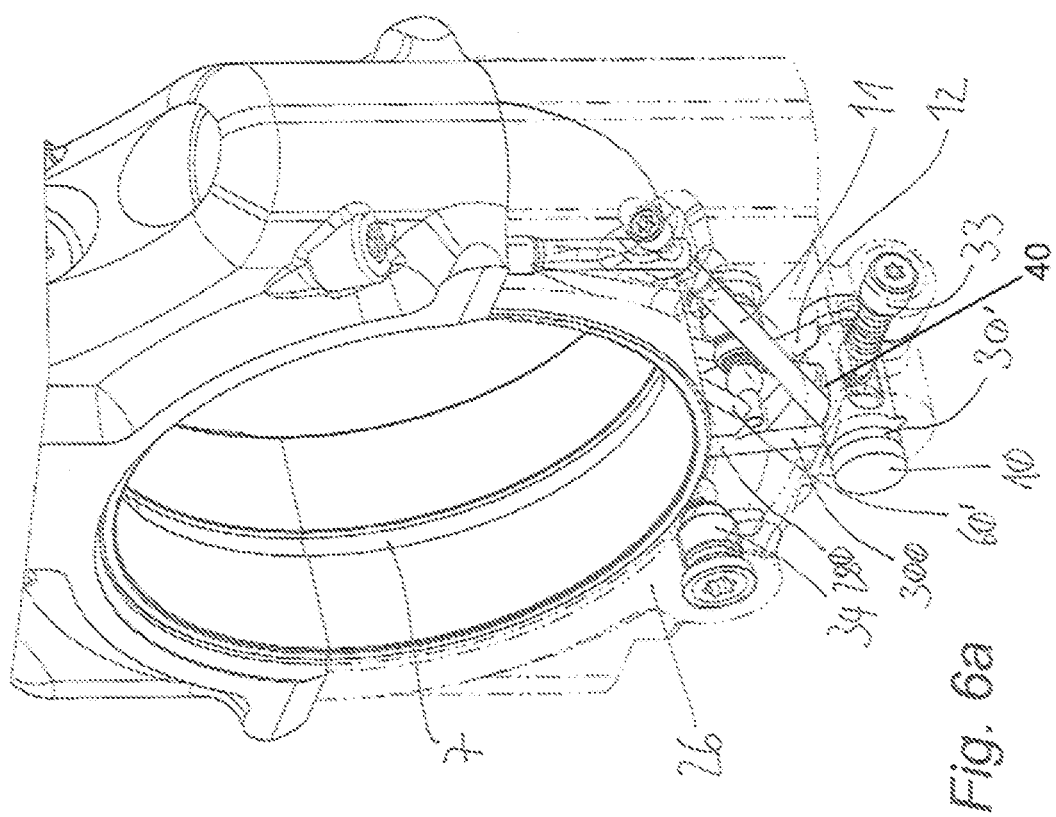

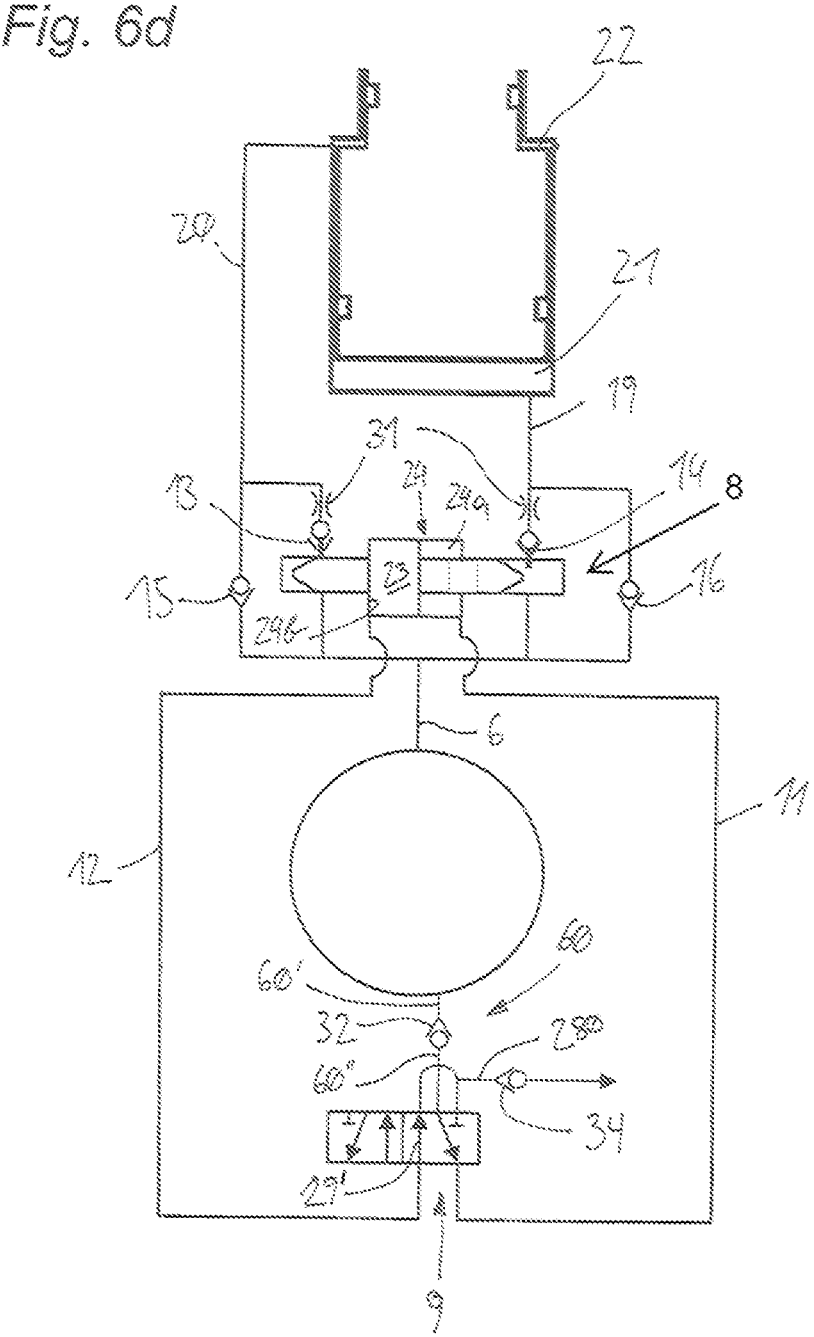

CONNECTING ROD HAVING AN ADJUSTABLE CONNECTING ROD LENGTH WITH A MECHANICAL ACTUATING MEANS

CROSS REFERENCE TO RELATED APPLICATIONS

This application is a national stage application under 35 U.S.C. 371 and claims the benefit of PCT Application No. PCT/EP2017/066959 having an international filing date of 6 Jul. 2017, which designated the United States, which PCT application claimed the benefit of German Patent Application No. 10 2016 008 306.9 filed 6 Jul. 2016 and Austrian Patent Application No. A 50757/2016 filed 23 Aug. 2016, the disclosures of each of which are incorporated herein by reference.

The invention relates to a connecting rod for a reciprocating piston engine, in particular a reciprocating piston internal combustion engine, having a length adjustment apparatus, in particular at least one hydraulic cylinder, for adjusting an operative and/or effective connecting rod length of the connecting rod which comprises at least one piston as well as a first hydraulic operating chamber and a second hydraulic operating chamber with a hydraulically actuable control device switchable between at least two switching states which has an actuating piston for controlling the adjustment of the connecting rod, wherein in a first switching state of the control device, hydraulic medium return from the first operating chamber is blocked and the second operating chamber is drained and in a second switching state, the first operating chamber is drained and hydraulic medium return from the second operating chamber is blocked.

The invention further relates to a reciprocating piston engine having a connecting rod according to the invention, in particular such a reciprocating piston engine designed as a reciprocating piston internal combustion engine, as well as a vehicle having such a reciprocating piston engine.

Generally speaking, the connecting rod of a reciprocating piston engine connects the crankshaft to the piston, wherein the connecting rod converts the linear motion of the power or working piston into the rotational motion of the crankshaft (linearly oscillating axial movement) or, inversely, a rotational motion into a linear motion.

The piston is preferably fixed at the smaller connecting rod eye by a piston pin; a connecting rod bearing is generally provided at the larger connecting rod eye by means of which the connecting rod is fixed to the rotating crankshaft. The connecting rod shaft is thereby generally arranged between the small end of the connecting rod, which is located at the head of the connecting rod, and the big end of the connecting rod, which is located at the base of the connecting rod.

Adjustable connecting rods are in particular used in reciprocating piston engines of variable compression ratio for regulating the compression ratio. The compression ratio can be changed by adjusting the connecting rod length as doing so shifts the top dead center of the piston movement. Length-adjustable connecting rods are generally known in the prior art, for example from WO 2015/055582 A2, AT 512 334 A1 and DE 10 2012 020 999 A1.

In particular, the applicant's PCT/EP2016/064194 printed publication relates to a length-adjustable connecting rod, respectively a length-adjustable connecting rod for a reciprocating piston engine, which has at least a first rod part and a second rod part, wherein the two rod parts are in particular telescopically movable toward or into each another in the direction of a longitudinal axis of the connecting rod by a length-adjusting apparatus, wherein the length-adjusting apparatus can be supplied with a hydraulic medium via at least one hydraulic channel, and wherein the at least one hydraulic channel can be fluidly connected to at least one hydraulic medium supply channel by means of a control device, wherein the control device comprises a first valve and a second valve, each with a respective valve body arranged in a valve chamber, wherein each valve body can be pressed against a respective valve seat by a restoring force, wherein a first valve chamber of the first valve is fluidly connected to a first hydraulic channel and a second valve chamber of the second valve is fluidly connected to a second hydraulic channel and the valve bodies are operatively connected to each other by a connecting device which is able to move between at least a first position and a second position, wherein in the first position of the connecting device, the first valve body, and in the second position of the connecting device, the second valve body can be respectively lifted from the associated first/second valve seat against the restoring force by the connecting device and the corresponding first/second valve chamber can be fluidly connected to the hydraulic medium supply channel, and in the respective other position of the connecting device, the first valve body is seated on the first valve seat or, respectively, the second body is seated on the second valve seat and blocks the fluid connection to the hydraulic medium supply channel. The content of this PCT/EP2016/064193 application is also incorporated into the subject matter of the present application by explicit reference thereto. In particular, the implementation of the length-adjusting apparatus as well as the control device, the hydraulic and/or mechanical connecting of the control device and the length-adjusting apparatus, as well as the arrangement and orientation of the control device can be inventively realized as cited in PCT/EP 2016/064193.

In principle, the problem associated with length-adjustable connecting rods is that of how the actuation or control of the connecting rod's length adjustment can be transmitted from an actuating system of the reciprocating piston engine to the linearly oscillating connecting rod.

In the case of mechanical transmission, the following approaches are found in the prior art:

Printed publication WO 2014/019684 A1 relates to a reciprocating piston internal combustion engine with variable compression having an actuating unit for changing a variable compression of the reciprocating piston internal combustion engine, wherein to change the variable compression, the actuating unit actuates a variable engine component in the form of a connecting rod of variable length, a piston having a variable compression height and/or a crankshaft having a variable crankshaft radius of the reciprocating piston internal combustion engine and the actuating unit is arranged in a lower region of the reciprocating piston internal combustion engine.

The printed publication DE 10 2005 055 199 A1 relates to a reciprocating piston internal combustion engine with at least one variable compression ratio in a piston which is adjustable by means of an adjusting mechanism comprising at least one eccentric tappet arranged in a connecting rod bearing lug or on a pin bearing lug of a connecting rod for changing an effective length of the connecting rod, an eccentric tappet adjustment path along which the eccentric tappet can move by means of an operative torque caused by a movement of the connecting rod, and at least one variable resistor which acts on an adjustment movement of the eccentric tappet and effects at least one dampened adjustment movement of the eccentric tappet.

The printed publication DE 10 2012 020 999 A1 relates to a reciprocating piston internal combustion engine having a hydraulic adjustment mechanism assigned to a connecting rod and comprising at least one eccentric tappet arranged in a connecting rod bearing lug or on a pin bearing lug of a connecting rod for adjusting at least one variable compression ratio in at least one cylinder of the reciprocating piston internal combustion engine by means of the adjustment mechanism changing an effective length $L_{eff}$ of the connecting rod, wherein the adjustment mechanism comprises a first hydraulic cylinder having a first piston in a first fluid chamber and a second hydraulic cylinder having a second piston in a second fluid chamber with the hydraulic cylinders being fluid-actuated and the at least one variable compression ratio is adjusted by means of at least the first piston moving in the first hydraulic cylinder, wherein the first and the second fluid chamber are connected by a first fluid line for a direct flow of the fluid back and forth between the first and the second fluid chamber while the first piston is moving in the first hydraulic cylinder, wherein the first fluid line is arranged in the connecting rod.

Printed publication DE 197 03 948 C1 relates to an apparatus for changing the compression of a reciprocating piston internal combustion engine which has a crankshaft fixedly mounted in the engine housing, a connecting rod supported at the crank of the crankshaft, an upward and downward-movable piston supported at the connecting rod within a fixed engine housing cylinder, and an eccentric sleeve supported at the crank by its cylindrical inner surface and at the connecting rod by its eccentric cylindrical outer surface relative the inner surface such that the effective length of the connecting rod can be changed by the sleeve rotating relative to the connecting rod, wherein the eccentric sleeve is formed with at least two locking recesses and that a locking member is fixed on the connecting rod which engages in one locking recess of the sleeve when moving in one direction and engages in the other locking recess of the sleeve when moving in another direction, wherein the one locked rotational position of the sleeve roughly corresponds to a maximum effective connecting rod length and the other locked rotational position roughly corresponds to a minimum effective connecting rod length.

Printed publication DE 102 13 890 B4 relates to an apparatus for changing the geometrical compression ratio in a reciprocating piston engine, in particular an internal combustion engine, which has one connecting rod per cylinder mounted on a crank pin of a crankshaft via an eccentric bearing ring, wherein the bearing ring is rotatable relative to the connecting rod between at least one first position for a minimum compression ratio and at least one second position for a maximum compression ratio, a fixing device for fixing the bearing ring in the first and/or in the second position, wherein the fixing device comprises at least one locking member loaded in the direction of a locking position by a spring which engages in a latching opening of the bearing ring in the locking position corresponding to the first and/or second position of the bearing ring, wherein the locking member can be brought out of the latching opening by a release device, and wherein when the locking member is released, the bearing ring having at least one edge flange can be rotated by a rotational device from at least the one to the other position, wherein the rotational device comprises a rotating member having at least one ramp movable radially to the crankshaft which can be brought into rolling contact with at least one outer peripheral area of one of the edge flanges of the bearing ring, wherein preferably at least one ramp forms a release member of the releasing device which acts directly on the locking member counter to the spring during the release process, and wherein the ramp is non-rotationally fixed to the housing of the reciprocating piston engine with respect to the crankshaft.

It is a task of the invention to provide an improved connecting rod for a reciprocating piston engine, the operative or effective connecting rod length of which can be adjusted. A particular task of the invention is that of providing an improved actuating mechanism for adjusting the effective connecting rod length.

This task is solved by a connecting rod according to claim 1 and a reciprocating piston engine having such a connecting rod according to claim 18. Advantageous embodiments of the invention are claimed in the dependent claims. The teaching of the claims is hereby made a part of the present description.

A first aspect of the invention relates to a connecting rod for a piston engine, in particular for a reciprocating piston internal combustion engine, comprising:
  a length adjustment apparatus, in particular at least one hydraulic cylinder, for adjusting an effective connecting rod length of the connecting rod, which comprises at least one piston as well as a first hydraulic operating chamber and a second hydraulic operating chamber,
  a hydraulically actuable control device switchable between at least two switching states which has an actuating piston for controlling the adjustment of the connecting rod, and
  a mechanically actuable actuating device for switching the control device, which is operatively connected via at least one hydraulic actuating line to the actuating piston of the control device for actuating it hydraulically,
wherein in a first switching state of the control device, hydraulic medium return from the first operating chamber is blocked and the second operating chamber is drained, and in a second switching state, the first operating chamber is drained and hydraulic medium return from the second operating chamber is blocked.

A second aspect of the invention relates to a reciprocating piston engine having at least one adjustable-length connecting rod according to the first aspect of the invention.

A third aspect of the invention relates to a vehicle with a reciprocating piston engine, in particular with a reciprocating piston internal combustion engine designed in accordance with the second aspect of the invention.

A connecting rod in the sense of the invention is an elongated connecting element usually found in reciprocating piston engines and arranged between the piston and crankshaft, by means of which the piston is mechanically connected to the crankshaft.

A reciprocating piston engine in the sense of the invention is an engine in which a linear stroke movement of a piston can be converted into a rotational motion of a shaft or, inversely, a rotational motion of a shaft into a piston's linear stroke movement.

A connecting rod shaft section in the sense of the invention is a section of the connecting rod, wherein a first connecting rod shaft section is preferably that connecting rod shaft section which faces the crankshaft in a functionally installed state of an inventive connecting rod in a reciprocating piston engine and the second connecting rod shaft section is the connecting rod shaft section facing the piston. Preferably, the second connecting rod shaft section exhibits a smaller connecting rod eye for the mechanical coupling with the piston and the first connecting rod shaft section exhibits a larger connecting rod eye for the connection to the crankshaft, in particular for the connection to a crank pin of a crankshaft.

Hydraulic medium return in the sense of the invention is a decrease in a hydraulic medium, in particular oil, in an operating chamber.

Draining in the sense of the invention means the enabling of hydraulic medium return; i.e. a decrease in the hydraulic medium in an operating chamber. Draining thereby ensues particularly by forces or respectively pressures acting on the connecting rod from outside the connecting rod, for example by way of the ignition process in an internal combustion engine, or which are introduced by a movement of the piston as a result of the crankshaft motion, for example the centrifugal forces at top dead center.

The invention is based in particular on the realization that an actuation of an length-adjustable connecting rod should preferably ensue mechanically since electrical actuation would require electrical/electronic components within the connecting rod which would be subjected on the one hand to the high forces occurring during connecting rod movement and on the other hand to the relatively high temperatures which occur for example in an internal combustion engine in the form of a reciprocating piston engine. The invention is thereby based in particular on the approach of disassociating the control of a hydraulic cylinder, which effects the actual adjustment of the effective connecting rod length, from the mechanical actuation by means of further hydraulics between the mechanically actuable actuating device and the actual control device for the hydraulic cylinder. It is in particular thereby possible for the switching direction from the actuating device to the actual control device; i.e. the direction of movement of displaceable elements of the actuating device and the control device; in the present case, preferably an actuating piston of the actuating device and an actuating piston of the control device, to be oriented in any given direction. This is advantageous since the control devices and/or their elements such as actuating pistons or, for example, even ball valves can be arranged so as relieve force in terms of centripetal or centrifugal forces. Preferably, the actuating piston of the control device can for example thereby also be aligned parallel to a longitudinal center plane of the connecting rod shaft. In this orientation to the connecting rod, there is substantially more space available for such movement than when perpendicular to the plane since the connecting rod only has a limited width. Additionally, the actuating device and the control device can be spatially arranged completely separately, in particular on two opposite sides of the larger connecting rod eye, for example the control device at the lower region of the connecting rod shaft and the actuating device in the big end of the connecting rod. Doing so can thereby also better utilize the very limited spatial conditions in the connecting rod for accommodating the elements necessary for actuating the length adjustment of the piston.

The inventive connecting rod is thereby preferably designed such that not only is the operative or effective length of the connecting rod adjustable; i.e. the distance between a rotational axis in the connecting rod small end and a rotational axis in the connecting rod big end, but also the absolute length of the connecting rod.

Thus, a switching of the control device can be effected by the mechanical actuation of the actuating device external of the connecting rod, in particular by an actuating element of the reciprocating piston engine. This switching of the control device is in turn used to control the filling of the two operating chambers of the hydraulic cylinder. The first operating chamber and the second operating chamber are thereby preferably arranged on opposite sides of the piston in the hydraulic cylinder; however, the operating chambers can also be preferably arranged in two different hydraulic cylinders, as shown for example in WO 2014/019684 A1 which was previously cited at the outset.

Advantageous embodiments of the invention will be presented in the following. Unless expressly excluded, the features of the individual embodiments can be combined.

In one advantageous embodiment, the connecting rod according to the invention comprises a first connecting rod section which is affixed to the outside of the length adjustment apparatus and/or accommodates the length adjustment apparatus, and a second connecting rod shaft section which is affixed to the at least one piston, wherein the two connecting rod shaft sections are displaceable relative to one another for adjusting a connecting rod shaft length, preferably telescopically, in particular telescopically into each other, particularly along a longitudinal axis of the connecting rod.

The length adjustment apparatus of the connecting rod can in principle be implemented in any given manner. Preferably, the length adjustment apparatus is however realized such that one of the two connecting rod shaft sections is designed as a guide body and the other shaft section as a piston element displaceable into said guide body, wherein in particular a first operating chamber is spanned between a first face side of the piston element and the guide body and a second operating chamber is spanned between the second face side of the piston element and the guide body, wherein a first hydraulic channel opens into the first operating chamber and a second hydraulic channel from the control device opens into the second operating chamber. A connecting rod shaft designed in this way enables very easily realizing an adjustable-control connecting rod, in particular a hydraulic adjustable-length connecting rod. The two connecting rod shaft sections thereby in particular form a hydraulic cylinder.

For setting the adjustable length of an inventive connecting rod designed as such, a preferably pressurized hydraulic medium can be supplied to the control device, in particular by way of a hydraulic medium supply channel. Each of the two hydraulic channels, which are respectively connected to one of the two operating chambers, can be fluidly connected to the hydraulic medium supply channel via the control device.

Depending on the state of the control device, in particular depending on the position of the actuating piston of the control device, either the first hydraulic channel, and thus the first operating chamber, or the second hydraulic channel, and thus the second operating chamber, is fluidly connected to a hydraulic medium supply channel.

Depending on which of the two operating chambers has the higher pressure or respectively which of the two operating chambers is drained, the two shaft sections of the connecting rod are telescopically pushed apart or together by the movement of the crankshaft and by external forces such that the operative or effective connecting rod length increases or decreases.

In a further advantageous embodiment, the inventive connecting rod comprises at least one hydraulic medium supply line which can be connected to the first operating chamber and the second operating chamber in terms of flow, wherein the connecting rod, in particular the control device, is designed such that the first operating chamber in a first switching state of the control device and the second operating chamber in a second switching state of the control device can be filled with the hydraulic medium via the hydraulic medium supply line.

In a further advantageous embodiment of the connecting rod, the first operating chamber and the second operating chamber are each fluidly connected to the hydraulic medium supply line, in particular permanently, by means of a check valve. In this embodiment, the operating chambers can in principle be continuously filled with the hydraulic medium, wherein the connecting rod length is controlled via draining.

The hydraulic medium supply line here is preferably connected in terms of flow to the connecting rod bearing seat on the crankshaft so that the hydraulic medium utilized there for lubrication flows into the hydraulic medium supply line. The operating chambers are thereby in particular high pressure chambers which can be sealed within the technical tolerances so as to be hydraulic medium-tight, even at high pressures greater than 1200 bar.

In a further advantageous embodiment of the inventive connecting rod, the actuating piston of the control device is arranged axially displaceable in a control chamber at least between a first switching position and a second switching position, wherein the control chamber is or can be fluidly connected to the at least one actuating line.

The actuating piston in this embodiment is preferably displaceable in the longitudinal center plane of the connecting rod. If the control device is designed as in the PCT/EP2016/064193, then globe valves are preferably arranged such that stroke axes of the valve bodies are oriented parallel to the crankshaft axis. As a result, they are uncoupled from the vertical and centrifugal acceleration occurring in the connecting rod. Relatively low spring restoring forces for the valve bodies thus suffice in order to keep the globe valves closed. This leads to good control device response behavior. High spring restoring forces would require very high forces; i.e. high hydraulic medium pressures, to open the valves. But even in this case, accelerations at very high crankshaft speeds, in particular more than 4000 U/min, preferably within a range of from 7000 to 8000 U/min, could lead to the valve bodies raising up off the valve seat.

Further preferably, the control chamber is designed as a control cylinder.

In a further advantageous embodiment of the inventive connecting rod, the control chamber of the control device is designed as a double-acting control, wherein the control of the control device is operatively connected to the actuating device by a first hydraulic actuating line and a second hydraulic actuating line, wherein the actuating piston divides the control chamber into a first control pressure chamber and a second control pressure chamber, and wherein the first control pressure chamber of the control chamber is or can be fluidly connected to the first actuating line and the second control pressure chamber of the control chamber to the second actuating line. A return spring for the actuating piston can be dispensed with in this advantageous embodiment since the actuating piston is displaced or respectively moved between the first control pressure chamber and the second control pressure chamber in the control device; i.e. axially displaced between the first switching position and the second switching position, by a pressure difference in the first control pressure chamber. In particular thereby able to be dispensed with is a change in the hydraulic medium pressure. The pressure of the hydraulic medium can always remain constant and is applied to either the one, the first control pressure chamber, or the second control pressure chamber. This is then particularly advantageous when the hydraulic medium is also used to lubricate the connecting rod bearing.

The actuating piston can in principle be in any desired orientation, several possible orientations are depicted in the PCT/EP2016/064193.

In a further advantageous embodiment of the inventive connecting rod, the actuating device comprises an actuating piston arranged in an actuating chamber which is axially displaceable between a first actuating position and a second actuating position, wherein the actuating piston is preferably axially displaceable perpendicular to a longitudinal center plane of the connecting rod shaft. In principle, the actuating piston, as also the actuating piston, can be in any desired orientation.

That means that the longitudinal axis of the actuating cylinder is preferably parallel to the crankshaft. This thereby results in being able to prevent displacements which may be caused by accelerations or decelerations in the crankshaft's rotational motion. The actuating device preferably is in a first actuating state when the actuating piston is in the first actuating position and in a second actuating state when the actuating piston is in the second actuating position. Preferably, three actuating states can also be provided, for example a neutral position by which the control device can be blocked.

Preferably, the actuating device comprises a locking device, in particular spring-loaded balls, which are pressed into recesses in the actuating piston in order to prevent unwanted slipping of the actuating piston.

In a further advantageous embodiment of the inventive connecting rod, the actuating chamber of the actuating device is designed as a double-acting actuating chamber, wherein the actuating piston preferably divides the actuating chamber into a first actuating pressure chamber and a second actuating pressure chamber, wherein in particular the first actuating pressure chamber is or can be fluidly connected to the first actuating line and the second actuating pressure chamber to the second actuating line.

Preferably, the connecting rod is designed in such a manner, in particular the actuating device and the control device, that a displacement of the actuating piston from the first actuating position to the second actuating position and vice versa in each case effects a switching of the control device, preferably from the first switching state into the second switching state and vice versa. In particular, a displacement of the actuating piston from the first actuating position to the second actuating position and vice versa effects a displacement of the actuating piston of the control device from the first switching position into the second switching position and vice versa.

Preferably, the actuating chamber, the actuating line and the control are filled with hydraulic medium such that an axial displacement of the actuating piston will be transmitted to the actuating piston via the hydraulic medium in the actuating chamber, the actuating line and the control chamber. An axial displacement of the actuating piston thereby produces an axial displacement of the actuating piston and thus a switching of the control device. In so doing, an externally induced mechanical displacing of the actuating piston, preferably by means of an actuating element in the crankshaft housing of the reciprocating piston engine, can effect an actuating of the control device via the hydraulic medium in the control lines and thus also a change in the hydraulic medium pressure or, respectively, in the volume of hydraulic medium in the operating chambers of the length adjustment apparatus and thus in turn a change in the effective length of the connecting rod shaft. If the control device drains the first operating chamber, the effective connecting rod length is preferably reduced, if in contrast the second operating chamber is drained, the connecting rod length is preferably increased.

To that end, the actuating piston is preferably guided in a recess extending perpendicular to the longitudinal center plane of the connecting rod shaft. Said recess is in particular arranged at the first connecting rod shaft section beneath the big end of the connecting rod. This recess preferably at least also partially forms the actuating chamber, wherein at least one end of the actuating piston projects laterally from said recess, in particular over at least a part of its displacement path. The actuating piston can in this way be actuated from the outside of the connecting rod.

Preferably, the actuating piston laterally projects from the connecting rod such that upon the stroke movement during a working stroke, the connecting rod shaft is guided past an actuating element fixed in position in the crankshaft housing which can further preferably be displaced by an actuator in such a manner that the actuating element can mechanically effect an axial displacement of the actuating piston, preferably from the first actuating position into the second actuating position or vice versa. Preferably, the axial displacement of the actuating piston can also be divided into multiple strokes of the connecting rod.

Preferably, the actuating piston exhibits outwardly projecting pin-like or rod-shaped, in particular cylindrical sections. Further preferably, the actuating piston leads out from the control chamber, similar to a connecting rod leading out of a damper housing in an anti-vibration device, so that the tightness of the control chamber can be ensured.

The actuating element in the crankshaft housing is preferably formed by a sliding block guide, in particular an adjustable sliding block guide. Of course the actuating element can also be part of an actuator apparatus and be for example hydraulically or electromagnetically actuable.

Advantageously, at least one end of the actuating piston is designed as a control surface. Preferably, same can be formed as a wedge surface. This enables easy displacement to be realized with a stationary actuating element, wherein the displacement is effected by the actuating element sliding on the wedge surface. Advantageous in this regard is for the coordinating of the wedge angle, contact pressure, etc.

In a further advantageous embodiment, the inventive connecting rod comprises at least one hydraulic medium supply line, wherein at least one of the actuating lines, preferably all of the actuating lines, are in each case fluidly connected to the hydraulic medium supply line so that the actuating line can be supplied with hydraulic medium via said hydraulic medium supply line. The hydraulic medium supply line is preferably supplied with the lubricating medium from the connecting rod.

In a further advantageous embodiment of the inventive connecting rod, the actuating line is in each case fluidly connected to the hydraulic medium supply line via a check valve. This can thereby ensure that a displacement of the actuating piston in the actuating chamber of the actuating device can build up actuating pressure for displacing the actuating piston of the control device. Part of the pressure could otherwise be dissipated again via the hydraulic medium supply line. The providing of the check valve or check valves in particular creates a closed hydraulic system between the actuating device and the control device.

In a further advantageous embodiment of the inventive connecting rod, the first actuating line and the first actuating pressure chamber form a first hydraulic volume and the second control pressure chamber, the second actuating line and the second actuating pressure chamber form a second hydraulic volume, wherein preferably the first hydraulic volume and/or the second hydraulic volume are formed as a substantially closed hydraulic volume and in particular not drained for or when switching the control device. A self-contained hydraulic apparatus is thereby produced.

In particular, the first and/or second hydraulic volume cannot be drained at all. Further preferably, neither the control chamber nor the actuating chamber nor the actuating line are drained. This thereby realizes a completely closed hydraulic medium circuit between the actuating device and control device. There can thus be no hydraulic medium return from this circuit. However, leakage within technical tolerances also occurs here. This is preferably offset by the check valve to the hydraulic medium supply line. The hydraulic lines are pressurized by the pressure of the hydraulic medium, for example by the lubrication pressure.

In a further alternative advantageous embodiment, the first hydraulic volume and/or the second hydraulic volume of the actuating device can be drained, wherein the connecting rod is preferably designed such that either the first hydraulic volume or the second hydraulic volume is drainable. Particularly the check valves between the actuating lines and the hydraulic medium supply line can be dispensed with in this embodiment.

In a further advantageous embodiment, the actuating device exhibits at least one drainage channel for draining the first hydraulic volume and/or for draining the second hydraulic volume, wherein the actuating device is preferably designed such that the second hydraulic volume is drained in a first actuating position of the actuating piston and the first hydraulic volume is drained in a second actuating position.

Both the operating chambers as well as the hydraulic volumes in the blocked and/or closed stated are to be functionally understood as being hydraulic medium-tight. In reality, however, leakage within technical tolerances may occur.

Preferably, the hydraulic volumes are drained via the actuating line. It can however also be alternatively provided for the control pressure chamber or the actuating pressure chamber to be respectively drained. Further preferably, the drainage occurs in the crankshaft housing.

In a further advantageous embodiment, the actuating piston comprises at least one drainage channel, wherein the drainage channel is preferably designed to drain hydraulic medium from the first hydraulic volume and/or the second hydraulic volume into the crankcase, wherein the actuating device is in particular designed such that in a first actuating position, the drainage channel is connected in terms of flow to the second hydraulic volume, preferably to the second actuating line, and in the second actuating position, to the first hydraulic volume, in particular to the first actuating line.

In a further advantageous embodiment of the inventive connecting rod, the actuating piston comprises an axial drainage channel which axially extends over the entire length of the actuating piston as well as preferably at least one first and one second radial drainage channel, wherein the radial drainage channels are in particular connected in terms of flow to the axial drainage channel. The providing of drainage channels in the actuating piston enables realizing particularly simple drainage of the hydraulic volumes.

In a further advantageous embodiment, the actuating device is designed such that in a first actuating position, the second hydraulic system, preferably the second actuating line, is connected in terms of flow to the second radial drainage channel and in the second actuating position, the first hydraulic volume is connected in terms of flow to the first radial drainage channel.

In a further advantageous embodiment of the connecting rod, the control device and the actuating device are arranged on opposite sides of the connecting rod big end. Doing so makes particularly effective use of the available space in the connecting rod. Moreover, an increase in weight on one side of the connecting rod from additional elements of the control device is offset on the other side of the connecting rod end by additional actuating device elements so as to be able to lessen an imbalance of the connecting rod.

In a further advantageous embodiment of the connecting rod, the control device is arranged in the connecting rod shaft, in particular in the first connecting rod shaft section, preferably closer to the big end of the connecting rod than the small end of the connecting rod.

The features and advantages cited in the foregoing with respect to the first aspect of the invention also apply to the second and third aspect of the invention accordingly.

In one advantageous embodiment of the reciprocating piston engine according to the invention, the actuating piston is mechanically displaceable by an actuating element fixed in position in the crankshaft housing, preferably from the first actuating position into the second actuating position and vice versa. Preferably, the actuating element is thereby designed as an actuator element of variable position.

These and further features and advantages are evident from the claims and the description as well as from the drawings, wherein the individual features can in each case be realized on their own or combined in the form of subcombinations in an embodiment of the invention and, provided same is technically feasible, can represent an advantageous as well as patentable implementation for which protection is likewise claimed.

Figure 2G:
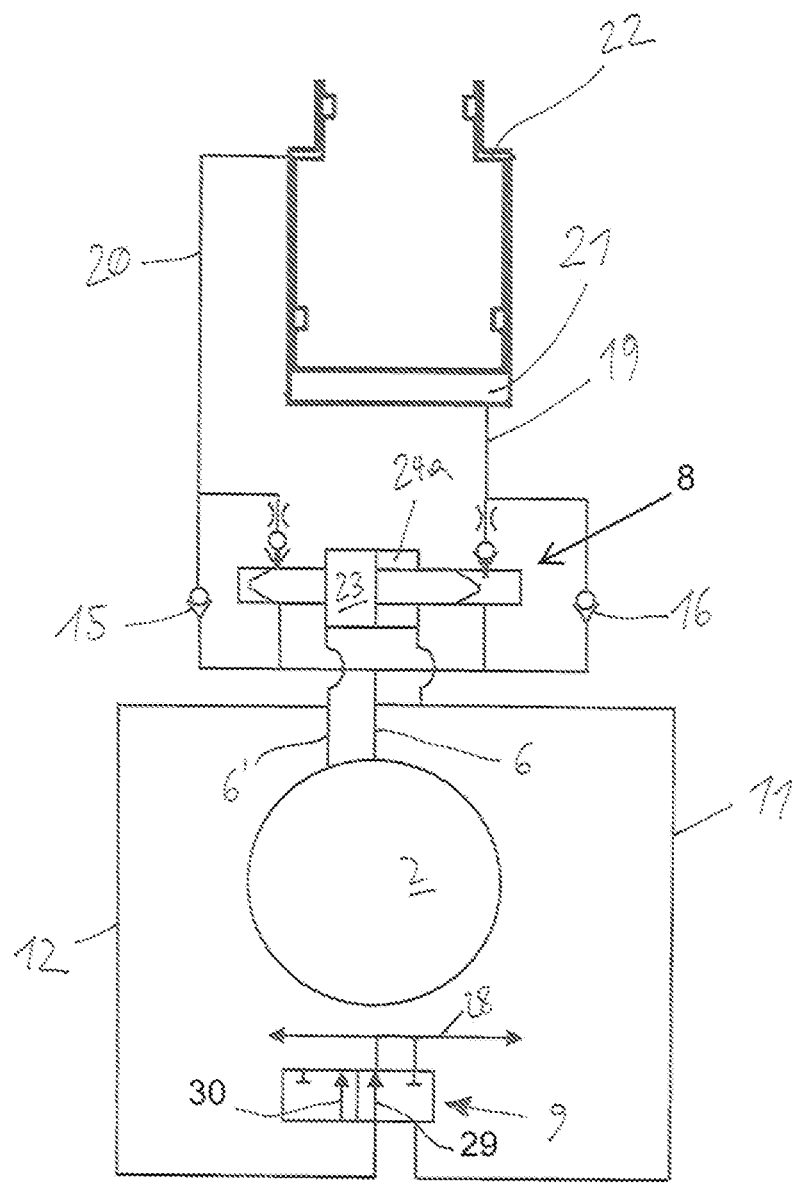
Figure 2H:
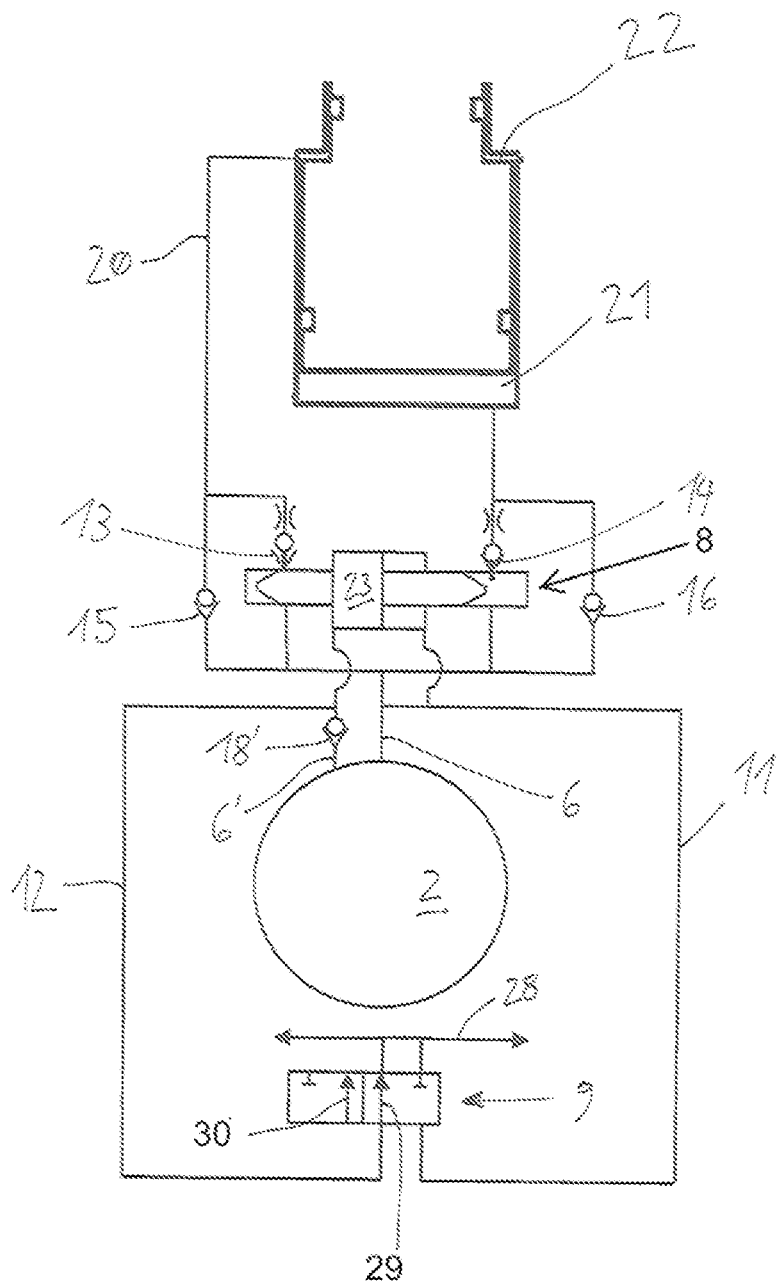
Figure 3G:
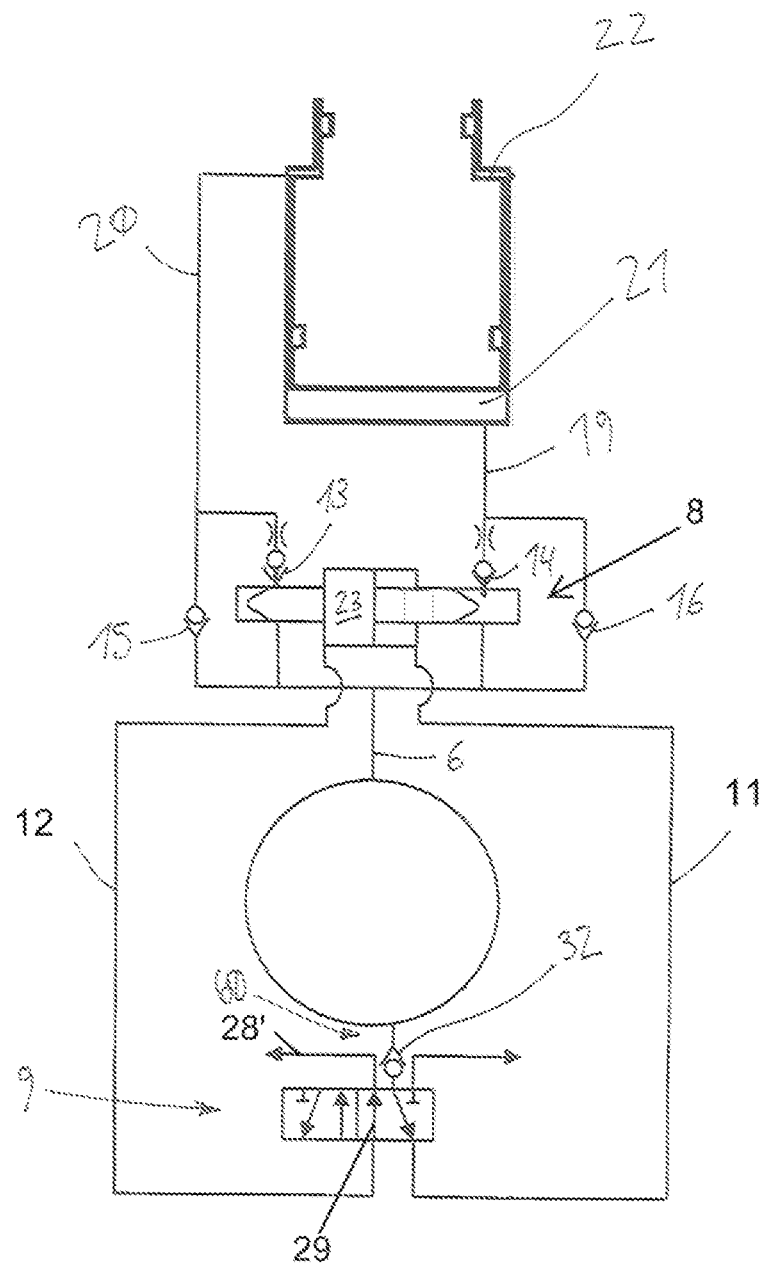
Figure 4B:
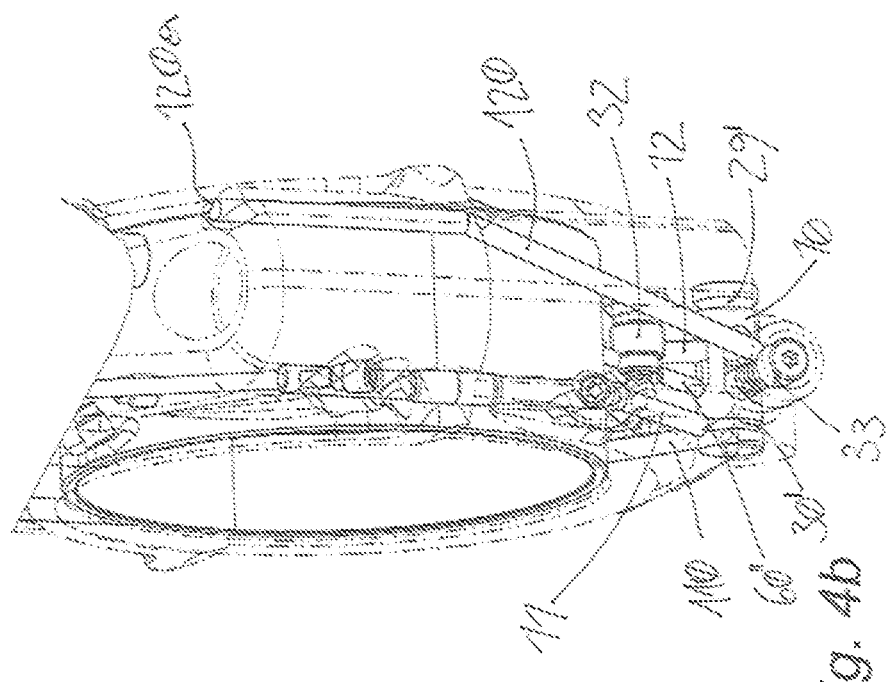
Figure 4A:
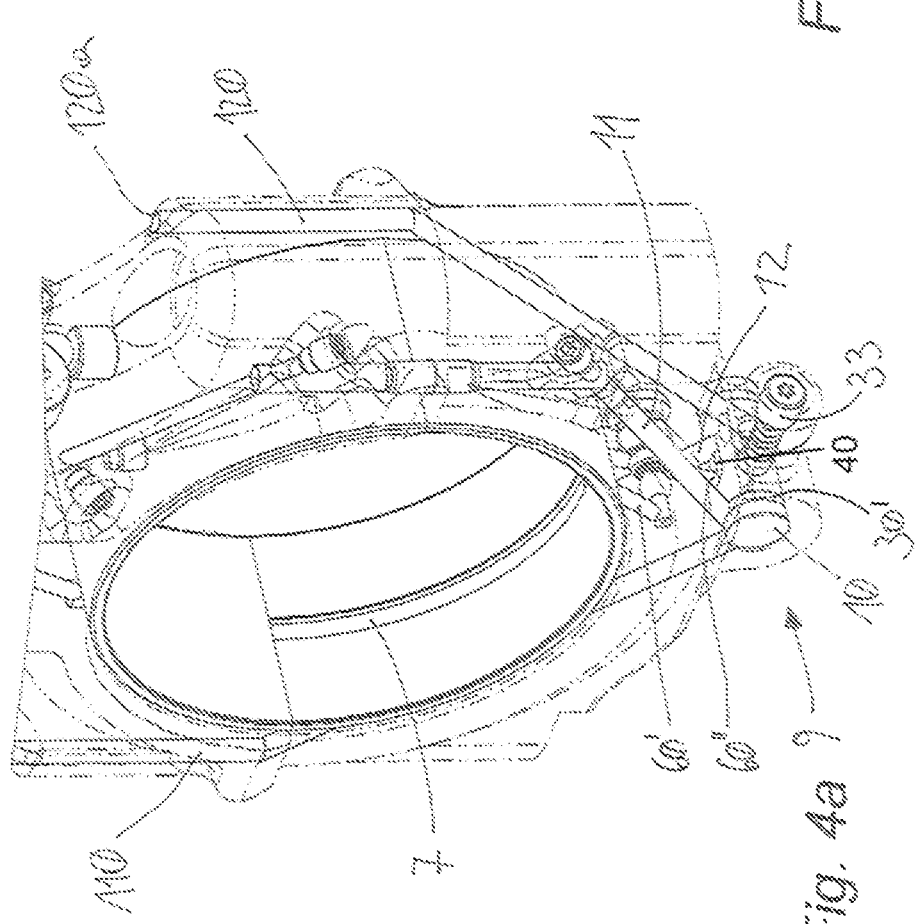
Figure 4C:
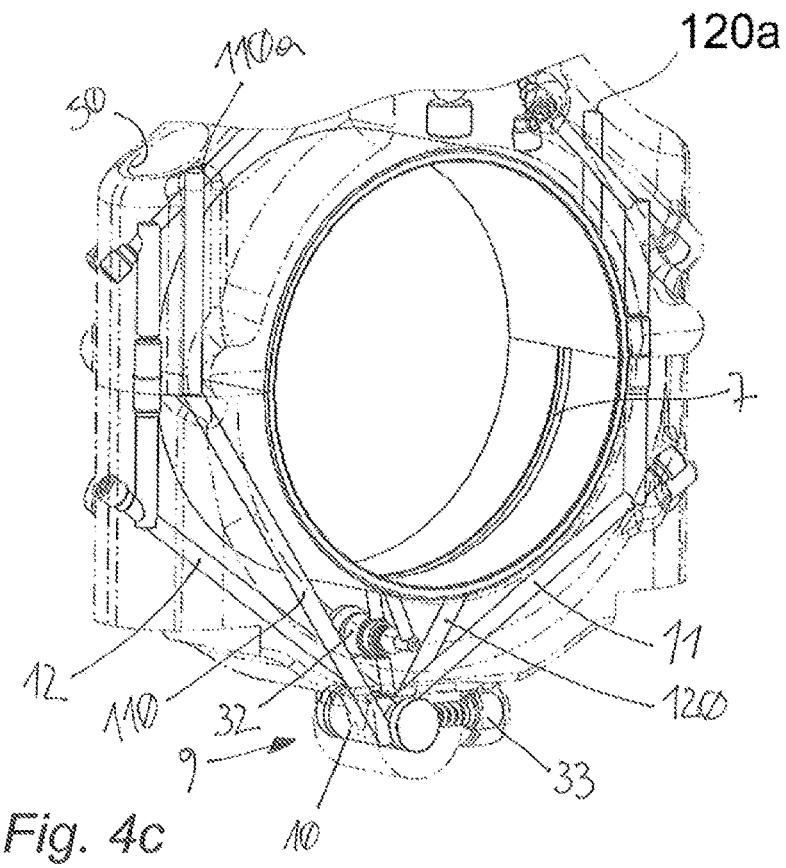
Figure 4D:
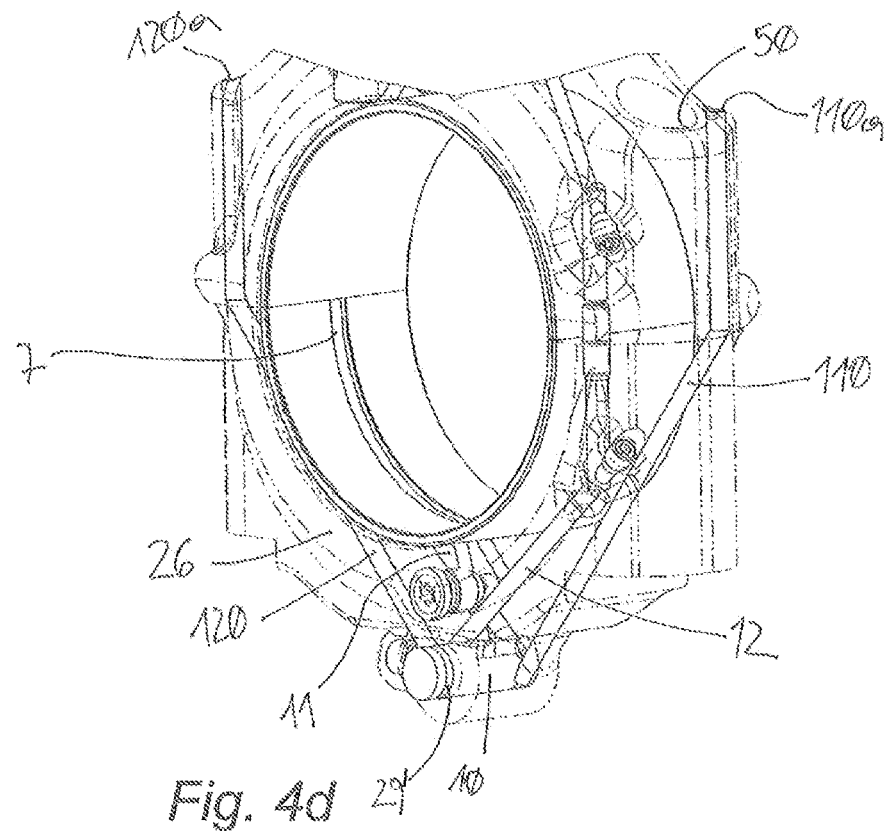
Figure 6C:
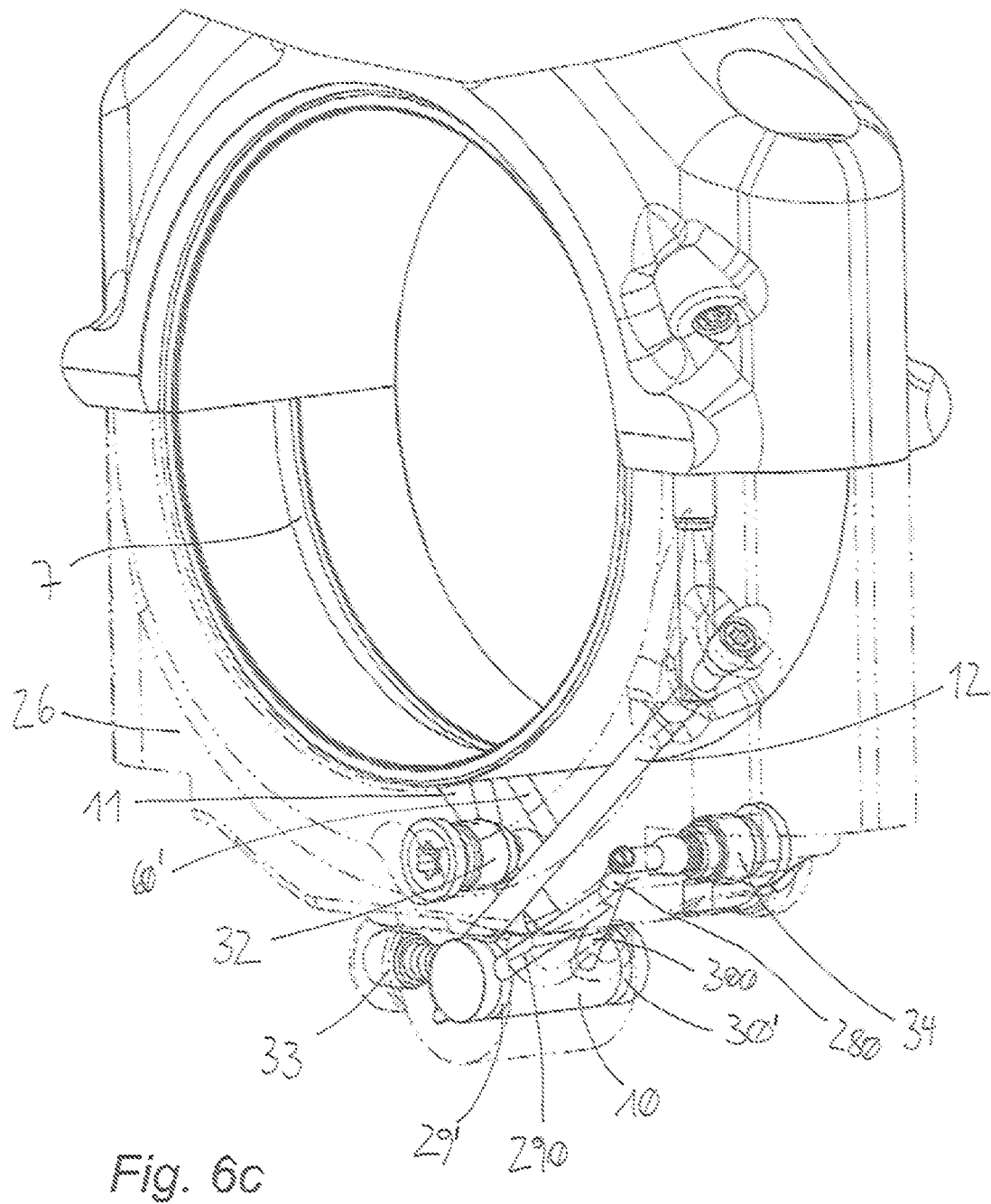

The invention will be described in greater detail in the following on the basis of non-limiting exemplary embodiments as depicted in the figures. Shown at least partly schematically therein are:

FIG. 1a a first exemplary embodiment of an inventive connecting rod in a first perspective representation, FIG. 1b the inventive connecting rod of FIG. 1a in a second perspective representation rotated 180° about a longitudinal axis of the connecting rod, FIG. 1c the inventive connecting rod from FIGS. 1a and 1b in a sectional view along the B-B sectional plane (see FIG. 1e), FIG. 1d the inventive connecting rod from FIGS. 1a to 1c in a sectional view along the x-x sectional plane (see FIG. 1c), FIG. 1e the inventive connecting rod from FIGS. 1a to 1d in longitudinal section, FIG. 1f the inventive connecting rod from FIGS. 1a to 1e in a sectional view along the A-A sectional plane (see FIG. 1e), FIG. 1g a hydraulic diagram of the inventive connecting rod of FIGS. 1a-1f, FIG. 2a a second exemplary embodiment of an inventive connecting rod in a first perspective representation, FIG. 2b the inventive connecting rod of FIG. 2a in a second perspective representation rotated 180° about a longitudinal axis of the connecting rod, FIG. 2c the inventive connecting rod from FIGS. 2a and 2b in a sectional view along the B-B sectional plane (see FIG. 2e), FIG. 2d the inventive connecting rod from FIGS. 2a to 2c in a sectional view along the x-x sectional plane (see FIG. 2c), FIG. 2e the inventive connecting rod from FIGS. 2a to 2d in longitudinal section, FIG. 2f the inventive connecting rod from Figs. FIGS. 2a to 2e in a sectional view along the A-A sectional plane (see FIG. 2e), FIG. 2g a first hydraulic diagram of the second exemplary embodiment according to FIGS. 2a-2f, FIG. 2h a second hydraulic diagram of the second exemplary embodiment according to FIGS. 2a-2f, FIG. 3a a variant of the second exemplary embodiment in a perspective, partly transparent partial view, FIG. 3b a view of the FIG. 3a representation slightly rotated about the longitudinal axis of the connecting rod, FIG. 3c a view of the FIG. 3a representation rotated 180° about the longitudinal axis of the connecting rod, FIG. 3d the inventive connecting rod from FIGS. 3a to 3c in a sectional view along a longitudinal axis of the connecting rod, FIG. 3e a perspective representation of the actuating piston of the alternative depicted in FIGS. 3a to 3d, FIG. 3f the actuating piston of FIG. 3e in a sectional view along its longitudinal axis, FIG. 3g a hydraulic diagram of the second exemplary embodiment variant according to FIGS. 3a-3d, FIG. 4a a further variant of the second exemplary embodiment in a first perspective, partly transparent partial view, FIG. 4b a view of the FIG. 4a representation slightly rotated about the longitudinal axis of the connecting rod, FIG. 4c the FIG. 4a variant in a second perspective, partly transparent partial view, FIG. 4d a view of the FIG. 4a representation rotated 180° about the longitudinal axis of the connecting rod, FIG. 4e the inventive connecting rod from FIGS. 4a to 4d in a sectional view along a longitudinal axis of the connecting rod, FIG. 4f the actuating piston of the variant depicted in FIGS. 4a to 4e in a sectional view along its longitudinal axis, FIG. 4g the actuating piston from FIG. 4f in perspective representation, FIG. 4h a hydraulic diagram of the second exemplary embodiment variant according to FIGS. 4a to 4e, FIG. 5 an alternative hydraulic diagram for the second exemplary embodiment variant according to FIGS. 4a to 4e, FIG. 6a yet a further variant of the second exemplary embodiment in a first perspective, partly transparent partial view, FIG. 6b a view of the FIG. 6a representation slightly rotated about the longitudinal axis of the connecting rod, FIG. 6c a view of the FIG. 6a representation rotated 180° about the longitudinal axis of the connecting rod, and FIG. 6d a hydraulic diagram of the second exemplary embodiment variant according to FIGS. 6a to 6c.

Elements which are the same are identified in the figures by the same reference numerals. Unless specified otherwise, clarifications of individual elements apply to all the figures in which said elements are depicted.

FIGS. 1a to 1f show different views of a first exemplary embodiment of an inventive connecting rod 100 for a (not shown therein) reciprocating piston internal combustion engine. FIG. 1g shows a hydraulic diagram of such a connecting rod 100.

The connecting rod 100 has a connecting rod small end 1 for connecting the connecting rod 100 to a piston of the reciprocating piston engine as well as a connecting rod big end 2 for connecting the connecting rod 100 to the crank pin of a crankshaft of the reciprocating piston engine, wherein the connecting rod big end 2 has a removable connecting rod bearing cap 26 which is bolted to the connecting rod shaft via connecting rod bolts 5.

The connecting rod small end 1 is part of an upper second connecting rod shaft section 3 and the connecting rod big end 2 is part of a first lower connecting rod shaft section 4.

The second connecting rod shaft section 3 is adjustable relative the second connecting rod shaft section 4 in the direction of a longitudinal axis of the connecting rod 100 between an extended position and a retracted position depicted in FIGS. 1a to 1f by adjustment range (ΔL), wherein the second connecting rod shaft section 3 and the first connecting rod shaft section 4 are in particular telescopically slidable into and out of each other such that an effective connecting rod length L is adjustable. The lower first connecting rod shaft section 4 thereby forms a guide body, in particular a guide cylinder, in which the upper second connecting rod shaft section 3 is received and guided.

The upper second connecting rod shaft section 3 thereby forms a piston of a double-acting hydraulic cylinder and the lower first connecting rod shaft section 4 forms the cylinder chamber, wherein a lower surface, i.e. a side facing the connecting rod big end 2, forms a first effective area of the piston and an upwardly oriented annular surface on the upper second connecting rod shaft section 3 (not depicted in greater detail here) forms a second effective area.

The first effective area of the upper second connecting rod shaft section 3 thereby forms a first hydraulic operating chamber 21 with the lower part of the guide cylinder of the lower first connecting rod shaft section 4 and the second effective area of the upper second connecting rod shaft section 3 forms a second hydraulic operating chamber 22 together with the upper part of the guide cylinder of the lower connecting rod shaft section 4 and a stop element (not depicted in greater detail here) inserted at the upper end in the guide cylinder of the lower first connecting rod shaft section 4.

The effective areas at the upper connecting rod shaft section form pressure application surfaces for a hydraulic medium conducted into operating chambers 21 and 22, wherein the engine oil used for lubricating the reciprocating piston internal combustion engine is in this case used as a hydraulic medium. A first hydraulic channel 19 flows into the first operating chamber 21 and a second hydraulic channel 20 flows into the second operating chamber 22.

If the lower first operating chamber 21 is filled with hydraulic medium and a return flow from the first operating chamber 21 is blocked and the upper second operating chamber 22 drained, connecting rod shaft sections 3 and 4 are pushed apart and the effective connecting rod length L increases. In contrast, if the lower first operating chamber 21 is drained and the upper second operating chamber 22 is filled with hydraulic medium and a return flow from the second operating chamber 22 is blocked, connecting rod shaft sections 3 and 4 are pushed into each other and the effective connecting rod length decreases.

The oil supply of the first and second hydraulic channel 19, 20 is provided via a hydraulic medium supply line 6 which is fluidly connected to the connecting rod bearing of the connecting rod big end 2 by an oil supply groove 7.

To control the filling of the operating chambers 21 and 22 with hydraulic medium and to drain the operating chambers 21 and 22, and thus control the adjustment of the effective connecting rod length L, the connecting rod 100 comprises a control device 8, wherein the control device 8 is arranged in the lower first connecting rod shaft section 4 in this example embodiment of an inventive connecting rod 100. The control device 8 is thereby in principle designed like a control device as described in PCT/EP2016/064193, to which reference is made for further details of the control device which are not described herein.

The control device 8 comprises a first globe valve 14 having a first valve chamber arranged in the flow path between the hydraulic medium supply line 6 and the first hydraulic channel 19 or first operating chamber 21 respectively, in which a first valve body preloaded by a first valve spring is pressed against a first valve seat, wherein the first hydraulic channel 19 leads into the first valve chamber.

The control device 8 further comprises a second valve 13 having a second valve chamber arranged in the flow path between the hydraulic medium supply line 6 and the second hydraulic channel 20 or second operating chamber 22 respectively, in which a second valve body preloaded by a second valve spring is pressed against a second valve seat, wherein the second hydraulic channel 20 leads into the second valve chamber. The first and second valve bodies of the two globe valves 13 and 14 are thereby formed by balls in the depicted exemplary embodiment.

The control device 8 further comprises an actuating piston 23 in this inventive connecting rod 100 which is axially displaceable in the connecting rod plane and normal to the longitudinal axis of the connecting rod in a double-acting control chamber 24 between a first switching position as depicted here and a second non-depicted switching position, said piston having axially extending rod-like ends and extending between the first globe valve 14 and the second globe valve 13, wherein the actuating piston 23 is designed such that in the first switching position, its end facing the first globe valve 13 lifts the valve body of the first globe valve 13 from the valve seat and thus clears the flow path between the second operating chamber 22 to the hydraulic medium supply line 6 via the second hydraulic channel 20 so that the second operating chamber 22 is drained while the end of the actuating piston 23 facing the second valve body of the second valve 14 is distanced from the valve body of the second globe valve 14 such that the valve body rests against the valve seat and blocks a return flow from the first operating chamber 21 into the hydraulic medium supply line 6.

Therefore, when a mass force acts on the connecting rod 100 during the stroke motion; i.e. during a working stroke of the connecting rod 100 which draws the first connecting rod shaft section 3 upward, hydraulic medium is drawn in by way of the technically closed first globe valve 14 in that the first valve body is raised against the restoring force of the first valve spring by the suction effect produced in the first operating chamber 21. The lower first operating chamber 21 is thus filled with hydraulic medium via the first hydraulic channel 19 while hydraulic medium is forced out of the upper second operating chamber 22 into the second hydraulic channel 20 and drained off into the hydraulic medium supply line 6 by way of the second globe valve 13 opened via the actuating piston 23. The connecting rod 100 thereby becomes longer. Several working strokes may be necessary in order to reach the maximum effective connecting rod length.

Correspondingly, in a second switching position, the actuating piston 23 effects a raising of the valve body of the second globe valve 14 from the valve seat such that the first operating chamber 21 is drained while the valve body of the first globe valve 13 rests against the valve seat so as to block a return flow from the second operating chamber 22.

Therefore, when a mass force acts on the connecting rod 100 during the stroke motion; i.e. during a working stroke of the connecting rod 100 which pushes the first connecting rod shaft section 3 downward, hydraulic medium is drawn in by way of the technically closed second globe valve 13 in that the second valve body is raised against the restoring force of the second valve spring by the suction effect produced in the second operating chamber 22. The upper second operating chamber 2s is thus filled with hydraulic medium via the second hydraulic channel 20 while hydraulic medium is forced out of the lower first operating chamber 21 into the first hydraulic channel 19 and drained off into the hydraulic medium supply line 6 by way of the first globe valve 14 opened via the actuating piston 23. The connecting rod 100 thereby becomes shorter. Several working strokes may likewise be quite necessary in order to reach the minimum effective connecting rod length.

To fill the operating chambers 21/22 faster, the control device 8 in this example embodiment still additionally comprises bypass hydraulic lines respectively connected directly to one of the operating chambers 21/22 via check valve 16/15, wherein check valve 15 is arranged in the flow path between the hydraulic medium supply line 6 and the second operating chamber 22 and check valve 16 is arranged in the flow path between the hydraulic medium supply line 6 and the first operating chamber 21.

In order to prevent pressure waves in the hydraulic length adjustment system which can lead to unwanted length adjustment on the one hand and, on the other, can adversely affect the entire hydraulic system of the reciprocating piston internal combustion engine or even cause damage, throttles 31 are additionally arranged in the flow path of some hydraulic channels.

For switching the control device 8 from the first switching state to the second switching state and vice versa; i.e. to move the actuating piston 23 from the first switching position into the second switching position and vice versa, the connecting rod 100 inventively comprises a mechanical actuating device 9 which is operatively connected to the actuating piston 23 of the control device 8 in this inventive connecting rod 100 via a first hydraulic actuating line 11 and a second hydraulic actuating line 12.

In addition, the actuating piston 23 divides the control chamber 24, in which the actuating piston 23 is arranged axially displaceable, into a first control pressure chamber 24a and a second control pressure chamber 24b, wherein the first control pressure chamber 24a is connected in terms of flow to the first actuating line 11 and the second control pressure chamber 24b is connected in terms of flow to the second actuating line 12 in this inventive connecting rod 100.

By a pressure difference being generated on the actuating piston 23, particularly a pressure difference between the first control pressure chamber 24a and the second control pressure chamber 24b, the actuating piston 23 can be moved from the first switching position into the second switching position.

To generate the pressure difference on the actuating piston 23 of control device 8, the actuating device 9 comprises an actuating piston 10 arranged in an actuating chamber 25 so as to be axially displaceable between a first actuating position and a second actuating position, wherein the actuating piston 10 is preferably axially displaceable perpendicular to a longitudinal center plane of the connecting rod 100, thus parallel to a crankshaft axis.

For the mechanical axial displacement by means of an adjusting element arranged in the crankshaft housing, the actuating piston 10 in the inventive connecting rod 100 is guided in a recess extending perpendicular to the longitudinal center plane of the connecting rod 100, in particular in a guided recess in the second connecting rod shaft section 4 beneath the connecting rod big end 2, wherein the recess also at least partially forms the actuating chamber 25, wherein at least one end of the actuating piston 10 projects laterally from the recess, in particular over at least a part of its displacement path.

The actuating piston 10 in this connecting rod 100 has pin-like or rod-shaped ends projecting from the actuating chamber 25, wherein the ends of the actuating piston lead out of the actuating chamber 25 in such a manner as to ensure the tightness of the actuating chamber 25 required for the actuating function of the control device 8.

This thereby allows the realization of particularly simple mechanical actuation of the actuating piston 10 and thus control device 8, for example by means of an actuating element (not shown here) arranged in the crankshaft housing, in particular an adjustable actuating element. The actuating element can for example be a sliding block guide and/or part of an actuator apparatus and be for instance designed as a hydraulically or electromagnetically actuable adjusting element, in particular as a type of actuating piston.

In particular, during a stroke movement; i.e. during a working stroke of the connecting rod, the actuating piston 10 can thereby be easily guided past an actuating element disposed in the crankshaft housing, in particular a sliding block guide, such that an axial displacement of the actuating piston 10 can be readily effected mechanically, preferably from the first to the second actuating position and vice versa. Preferably one working stroke can thereby displace the actuating piston 10 from the first actuating position into the second actuating position.

The actuating chamber 25 of the actuating device 9 is likewise designed as a double-acting actuating chamber 25, wherein the actuating piston 10 divides the actuating chamber 25 into a first actuating pressure chamber 25a and a second actuating pressure chamber 25b. The first actuating pressure chamber 25a is thereby fluidly connected to the first actuating line 11; i.e. connected in terms of flow, as is the second actuating pressure chamber 25b to the second actuating line 12.

The first control pressure chamber 24a, the first actuating line 11 and the first actuating pressure chamber 25a in the connecting rod 100 form a first substantially closed hydraulic volume and the second control pressure chamber 24b, the second actuating line 12 and the second actuating pressure chamber 25b form a second likewise substantially closed hydraulic volume.

The first hydraulic volume and the second hydraulic volume are not thereby drained, yet respectively fluidly connected to the hydraulic medium supply line 6 via a check valve 17/18 so that each actuating line 11, 12 can be supplied with hydraulic medium via the hydraulic medium supply line 6 and always amply filled with hydraulic medium, wherein sufficient hydraulic medium filling of the actuating lines 11, 12, in particular with engine oil, is generally ensured by the permanently given oil pressure in a reciprocating piston internal combustion engine.

Due to the fact that the first and second hydraulic volume can be refilled with hydraulic medium via the hydraulic medium supply line 6, the first and the second hydraulic volume are thus only designated as substantially closed hydraulic volumes and not completely closed hydraulic volumes. Moreover, leakage can occur. However, loss of hydraulic medium due to leakage can be easily offset by virtue of the connections of actuating lines 11 and 12 to the hydraulic medium supply line 6 via check valves 17 and 18.

Due to the two closed hydraulic volumes, if the actuating piston 10 in this first described example embodiment of an inventive connecting rod 100 is displaced from the first actuating position depicted in FIG. 1*c*, to the right as relates to the FIG. 1*c* depiction, a pressure force to the right is applied to the actuating piston 23 via actuating line 12 and a suction force acting in the same direction via actuating line 11 which results in a rightward axial displacement of the actuating piston 23 and consequently a drainage of the first operating chamber 21 and a filling of the second operating chamber 22. Thereby in turn effected is an adjustment of the effective connecting rod length L, in particular a shortening of the connecting rod length L.

In the process, the actuating chamber 25, the actuating lines 11 and 12 and the control chamber 24 are filled with hydraulic medium and operatively connected to one another such that the hydraulic medium in the actuating chamber 25, in the actuating lines 11 and 12 and in the control chamber 24 transmits an axial displacement of the actuating piston 10 to the actuating piston 23 so that an axial displacement of the actuating piston 10 effects an axial displacement of the actuating piston 23 and thereby a switching of the control device and thus a length adjustment of the connecting rod 100.

The functionality is also depicted in the hydraulic diagram of FIG. 1*g*. For the sake of clarity and irrelative of any constructional implementation, the hydraulic medium supply line 6 is arranged at the upper region of the connecting rod big end 2 facing the connecting rod small end 1 (not shown in FIG. 1*g*) and the oil supply groove 7 not shown. In addition, FIG. 1*g* shows spring-loaded locking elements 42—for example spring-mounted bolts guided in corresponding drill holes—for the actuating piston 10 and the actuating piston 23 in schematic form, these holding the pistons 10, 23 in their respective positions, for example by the locking elements 42 engaging into the corresponding recesses on the outer circumference of the pistons 10, 23. This thereby prevents the pistons 10, 23 from moving out of position during the operation of the connecting rod 100 and causing misalignments or faulty switching of the connecting rod.

FIGS. 2*a* to 2*f*, 2*g* and 2*h* show a second exemplary embodiment of an inventive connecting rod 200, wherein in contrast to the previously described connecting rod 100 based on FIGS. 1*a* to 1*f*, the first hydraulic volume and the second hydraulic volume in this connecting rod 200 can be drained, wherein the first hydraulic volume is drained in one actuating state of the actuating device and the second hydraulic volume in the other actuating state.

To that end, the actuating device 9 comprises drainage channels 28, 29 for draining the first hydraulic volume and drainage channels 28, 30 for draining the second hydraulic volume, wherein the actuating device 9 is designed such that the second hydraulic volume is drained in the first actuating position of actuating piston 10 and the first hydraulic volume in the second actuating position.

The hydraulic medium carried in the drained hydraulic volume can be drained off into the crankcase via drainage channels 28, 29, 30, wherein the hydraulic pressure in the other non-drained hydraulic volume and the resulting pressure difference developing on the actuating piston 23 of the control device 23 effects an axial displacement of the actuating piston 23. The acting pressure in the non-drained hydraulic volume thereby corresponds to the oil pressure of the reciprocating piston internal combustion engine since also in this embodiment example; i.e. also in the case of connecting rod 200, the respective actuating lines 11 and 12 are fluidly connected directly to the hydraulic medium supply line 6 and/or directly to the connecting rod bearing of the connecting rod big end 2. Yet this embodiment alternative, the hydraulic diagram of which is depicted in FIG. 2*g*, has the advantage of being able to dispense with the check valves 17 and 18 of the first connecting rod 100. FIG. 2*g* shows the connection of the control chamber 24 to the connecting rod bearing which ensues via the hydraulic medium supply line 6 and an additional hydraulic medium line 6'. FIG. 2*h* shows the hydraulic diagram of one variant of the second exemplary embodiment, wherein a check valve 18' is provided between the additional hydraulic medium line 6' and the control chamber 24, or second control pressure chamber 24*b* respectively. This check valve 18' can check the pressure waves which develop due to the hydraulic reciprocating of the actuating piston 23 and which can continue on into the connecting rod bearing.

The drainage channels 28, 29 and 30 are thereby disposed in the actuating piston 10, wherein the drainage channels 28, 29 and 30 are designed to lead off hydraulic medium from the first hydraulic volume or respectively second hydraulic volume into the crankcase.

In a first actuating position (see e.g. FIGS. 2*g* and 2*h*), drainage channels 29 and 28 are connected in terms of flow to the second hydraulic volume, in particular to the second actuating line 12, and in the second actuating position, drainage channels 30 and 28 are connected to the first hydraulic volume, in particular to first actuating line 11.

The actuating piston 10 comprises an axially extending drainage channel 28 which axially extends over the entire length of the actuating piston 10 as well as a first radial drainage channel 29 and a second radial drainage channel 30, wherein the radial drainage channels 29, 30 are fluidly connected to axial drainage channel 28.

The actuating device 9 is thereby designed such that the second hydraulic volume, preferably the second actuating line 12, is fluidly connected to the first radial drainage channel 29 in a first actuating position, and the first hydraulic volume is fluidly connected to the second radial drainage channel 30 in the second actuating position.

A further variant of the second exemplary embodiment is depicted in FIGS. 3*a* to 3*f* and the hydraulic diagram of FIG. 3*g*.

A hydraulic medium supply line 60 is therein depicted in FIGS. 3*a* and 3*b* which is arranged in the lower region of the connecting rod big end 2 on the far side from the connecting rod small end 1 (not depicted in FIGS. 3*a* and 3*b*) and directly connected in terms of flow to actuating device 9. The hydraulic medium supply line 60 is accordingly branched off at the region of the connecting rod bearing of the connecting rod big end 2 exactly opposite the connecting rod small end 1.

In the depicted exemplary embodiment, a check valve 32 is arranged in the hydraulic medium supply line 60 which serves to improve the functionality and prevent hydraulic medium from the hydraulic volumes from flowing back into the connecting rod bearing. To that end, a first hydraulic medium supply line section 60' extends between the oil supply groove 7 of the connecting rod bearing and the check valve 32 while a second hydraulic medium supply line section 60" extends between the check valve 32 and the actuating device 9.

In contrast to the variant of FIGS. 2a to 2h, both the filling as well as the drainage of the hydraulic volumes here are thus controlled by the actuating device 9. As can be seen particularly from FIGS. 3d to 3f, the actuating piston 10 does not have a continuous axial drainage channel but rather two axial drainage channel sections 28', 28" arranged at opposite narrow sides of the actuating piston 10 and respectively fluidly connected to a radial drainage channel 29, 30. Respective circumferential drainage grooves are realized where the radial drainage channels 29, 30 meet the outer circumferential surface of the actuating piston 10. The first axial drainage channel section 28' is connected to the first radial drainage channel 29 and can thereby establish a fluid connection to the second hydraulic volume while the second axial drainage channel section 28" is connectable to the second radial drainage channel 30 and the first hydraulic volume, in particular the first actuating line 11. The actuating piston 10 thereby functions as a 5/3-way valve.

The actuating piston 10 additionally comprises a filling slot 40 and a guide slot 41. Depending on the actuating position of the actuating piston 10, the filling slot 40 connects the hydraulic medium supply line 60 either to the first actuating line 11 or the second actuating line 12 and thus the respectively associated hydraulic volume.

By means of a spring-loaded guide bolt 33 engaging therein, the guide slot 41 serves as a stop for the axial movement of the actuating piston 10, which despite its motion is thereby held in the receiving hole. Similar to the locking elements 42 depicted in FIG. 1g, the guide slot 41 and guide bolt 33 combination can serve to hold the actuating piston 10 in one of the respectively assumed actuating positions—two additional recesses corresponding to the respective actuating positions and into which guide bolt 33 engages can for example be provided thereto in the guide slot 41. In one embodiment which is not depicted, a circumferential groove combining the filling slot 40 and guide slot 41 can also be provided partly or completely around the surface area of the actuating piston 10.

In a first actuating position, depicted in FIGS. 3a to 3d, the first hydraulic volume is connected to oil supply groove 7: Oil pressure acts on check valve 32 by way of the first hydraulic medium supply line section 60', pushes the valve body out of its seat against the spring pressure of the valve, and flows via the second hydraulic medium supply line section 60" into the filling slot 40 and from there further into the first actuating line 11 and from there into the control chamber 24 which is however not shown in FIGS. 3a to 3d for the sake of clarity. The second hydraulic volume is at the same time fluidly connected to the first radial drainage channel 29 and the first axial drainage channel section 28'; hydraulic medium is drained off from the second actuating line 12 into the crankcase. A shortening of the connecting rod ensues.

The hydraulic diagram in FIG. 3g likewise shows the first actuating position of the first hydraulic volume being filled and the second hydraulic volume being drained via the first (radial) drainage channel 29 and the first axial drainage channel section 28'.

One variant of the exemplary embodiment according to FIGS. 3a to 3g with slight differences is depicted in FIGS. 4a to 4g and the hydraulic diagram of FIG. 4h.

In principle, the filling function is solved in the same way as in the FIGS. 3a to 3g variant, although there are differences when draining: Instead of the axial drainage channel sections 28', 28" arranged within the actuating piston 10 and radial drainage channels 29, 30 as are depicted for example in FIG. 3f, circumferential drainage grooves 29', 30' are provided (see e.g. FIG. 4g).

Said drainage grooves 29', 30' establish a fluid connection between the respective hydraulic volumes to be drained and an associated siphon channel 110, 120 guided from the lower region of the connecting rod bearing cap 26 within the first connecting rod shaft section 4 toward the connecting rod small end 1 and connected to the crankcase via siphon channel opening 110a, 120a.

FIGS. 4a to 4c clearly show a second actuating position of the actuating piston 10 in which the first hydraulic volume is being drained: The first actuating line 11 is fluidly connected to the second drainage channel 30' and hydraulic medium flows into the first siphon channel 110 via the groove. The hydraulic medium rises along the connecting rod big end 2 and the connecting rod bolt 5 (not shown in FIGS. 4a to 4c) by way of the first siphon channel 110 up to a first siphon channel opening 110a from where it discharges into the crankcase. The first siphon channel opening 110a is thereby arranged near an upper opening 50 of the recess for receiving a connecting rod bolt 5 in the depicted example embodiment.

A second siphon channel 120 having a second siphon channel opening 120a is allocated to the second actuating line 12, albeit these are not in fluid communication in the second actuating position: The second hydraulic volume is connected via filling slot 40 to the oil supply groove 7 in the connecting rod bearing by hydraulic medium supply line 60 and filled with hydraulic medium which flows into control chamber 24 (not depicted in FIGS. 4a to 4e) via the second actuating line 12. This variant thus provides for the lines leading away from the actuating device 8 for draining the chambers disposed in the connecting rod to run upward in geodetic terms when the connecting rod is used as intended, thus toward the connecting rod small end 1, and have at least one opening positioned as close as possible to the control device 9. This thereby enables achieving the equalizing of the oil columns and oil pressures in the lines between the control device 9 and actuating device 8, or the drainage channels respectively. Siphon channels 110, 120 and associated siphon channel openings 110a, 120a are provided thereto. The siphon channels 110, 120 have the advantage of the hydraulic volumes being able to be emptied in slow and controlled manner and no air being able to infiltrate the system during the operation of the connecting rod.

FIG. 5 shows an alternative hydraulic diagram in which only one common siphon channel 100 is provided to empty both hydraulic volumes which is furthermore fluidly connected to the second hydraulic medium supply line section 60": Both drained hydraulic medium as well as hydraulic medium intended for filling flow together in the second hydraulic medium supply line section 60". Manufacture can thus be facilitated as fewer drill holes need to be made in the connecting rod.

A further variant of the second exemplary embodiment is depicted in FIGS. 6a to 6c and the hydraulic diagram of FIG. 6d. The filling of hydraulic medium into the hydraulic volumes thereby ensues as already described above, namely via a first 60' and a second hydraulic medium supply line section 60", wherein a check valve 32 is arranged between said sections 60', 60". The position of the actuating piston 10 can control which of the hydraulic volumes is to be filled.

Hydraulic volume draining ensues via drainage grooves 29', 30' realized on the outer circumference of the actuating piston 10 as described above in conjunction with FIGS. 4a to 5. A third drainage channel 290 and a fourth drainage channel 300 are provided in the connecting rod bearing cap 26 which merge into one common drainage channel 280 emptying into the crankcase by way of drainage check valve 34.

Depending on the position of the actuating piston 10, the first or the second hydraulic volume can be fluidly connected to its associated drainage channel 290, 300 such that the respective hydraulic volume is drained.

FIGS. 6a to 6c show the first actuating position in which the first hydraulic volume is filled and the second hydraulic volume drained: The first actuating line 11 is in fluid connection with the connecting rod bearing via the filling slot 40 in the actuating piston 10 and hydraulic medium flows into the first hydraulic volume via the first hydraulic medium supply line section 60', the check valve 32 and the second hydraulic medium supply line section 60". The second actuating line 12 is fluidly connected to the first drainage groove 29' and hydraulic medium flows out of the second hydraulic volume into the third drainage channel 290 and common drainage channel 280 and exits into the crankcase by way of the drainage check valve 34. The drainage check valve 34 prevents air from being drawn in from the crankcase and entering the system during operation.

In the second actuating position, which is not depicted in the figures, the first hydraulic volume is drained via the second drainage groove 30', the fourth drainage channel 300, the common drainage channel 280 and drainage check valve 34 and the second hydraulic volume is filled from the connecting rod bearing.

The hydraulic diagram in FIG. 6d shows the FIGS. 6a to 6c implementation with the minimal addition, similar to FIG. 5, of the second hydraulic medium supply line section 60" being fluidly connected to drainage channels 280, 290, 300—e.g. to the common drainage channel 280. The provisioning of drill holes can likewise be reduced or respectively simplified in this implementation.

As can be seen from the respective hydraulic diagrams, the control devices 8 in the variants depicted in FIGS. 3a to 3d, 4a to 4e and 6a to 6c are in each case realized as illustrated in FIGS. 1a to 1f and 2a to 2f. Other embodiments are of course also possible. The function for lengthening and shortening the connecting rod is also realized in the manner described in conjunction with FIGS. 1a to 1g and FIGS. 2a to 2h and therefore not described again.

The connecting rod according to the invention enables the realization of particularly simple mechanical actuation of a hydraulic length adjustment.

LIST OF REFERENCE NUMERALS 100, 200 inventive connecting rod
1 small end of connecting rod
2 big end of connecting rod
3 second connecting rod shaft section
4 first connecting rod shaft section
5 connecting rod bolt
6, 60 hydraulic medium supply line
6' additional hydraulic medium line
7 oil supply groove
8 control device
9 actuating device
10 actuating piston
11 first actuating line
12 second actuating line
13 globe valve to second operating chamber 22
14 globe valve to first operating chamber 21
15 check valve between hydraulic medium supply line 6 and second operating chamber 22
16 check valve between hydraulic medium supply line and second operating chamber 21
17 check valve between hydraulic medium supply line 6 and first actuating line 11
18 check valve between hydraulic medium supply line 6 and second actuating line 12
18' check valve between additional hydraulic medium line 6' and control chamber 24 (respectively second control pressure chamber 24b)
19 hydraulic channel to first operating chamber 21
20 hydraulic channel to second operating chamber 22
21 first operating chamber
22 second operating chamber
23 actuating piston
24 control chamber
24a first control pressure chamber
24b second control pressure chamber
25 actuating chamber
25a first actuating chamber
25b second actuating chamber
26 connecting rod bearing cap
27 connecting rod bearing shell
28 axial drainage channel
28' first axial drainage channel section
28" second axial drainage channel section
29 first radial drainage channel
29' first drainage groove
30 second radial drainage channel
30' second drainage groove
31 throttle
32 check valve between oil supply groove 7 and actuating device 6, arranged between first 60' and second 60" hydraulic medium supply line section
33 (spring-loaded) guide bolt
34 drainage check valve
40 filling slot
41 guide slot
42 (spring-loaded) locking element
50 upper recess opening for receiving a connecting rod bolt 5
60' first hydraulic medium supply line section
60" second hydraulic medium supply line section
100 common siphon channel
110 first siphon channel
110a first siphon channel opening
120 second siphon channel
120a second siphon channel opening
280 common drainage channel
290 third drainage channel
300 fourth drainage channel
L effective connecting rod length

What is claimed is:

1. A connecting rod for a reciprocating piston engine comprising:
a length adjustment apparatus for adjusting an effective connecting rod length of the connecting rod, which comprises at least one piston, a first hydraulic operating chamber, and a second hydraulic operating chamber,
a hydraulically actuable control device switchable between at least two switching states and which has an actuating piston for controlling an adjustment of the connecting rod, and
an actuating device mechanically actuable from outside of the connecting rod, the actuating device configured for switching the control device operatively connected via at least one hydraulic actuating line to the actuating piston of the control device for actuating it hydraulically.

2. The connecting rod according to claim 1, wherein in a first switching state of the control device, hydraulic medium return from the first operating chamber is blocked and the second operating chamber is drained, and in a second switching state, the first operating chamber is drained and hydraulic medium return from the second operating chamber is blocked.

3. The connecting rod according to claim 1, wherein the actuating device, the control device and the at least one hydraulic actuating line define an at least substantially closed hydraulic volume.

4. The connecting rod according to claim 1, wherein the control device and the actuating device are arranged at least substantially inside the connecting rod.

5. The connecting rod according to claim 1, wherein the connecting rod comprises a first connecting rod shaft section which is fixed on an outside of the length adjustment apparatus and/or accommodates the length adjustment apparatus, and a second connecting rod shaft section which is fixed on the at least one piston, wherein the two connecting rod shaft sections are displaceable relative to each other for adjusting a connecting rod shaft length along a longitudinal axis of the connecting rod.

6. The connecting rod according to claim 1, wherein the connecting rod comprises at least one hydraulic medium supply line which can be fluidly connected to the first operating chamber and the second operating chamber, wherein the control device is designed such that the first operating chamber in a first switching state of the control device and the second operating chamber in a second switching state of the control device can be filled with hydraulic medium via the hydraulic medium supply line.

7. The connecting rod according to claim 1, wherein the first operating chamber and/or the second operating chamber are each fluidly connected to the hydraulic medium supply line by means of a check valve.

8. The connecting rod according to claim 1, wherein the actuating piston of the control device is arranged axially displaceable in a control chamber between a first switching position and a second switching position, wherein the control chamber is or can be fluidly connected to the at least one actuating line.

9. The connecting rod according to claim 8, wherein the control chamber of the control device is designed as a double-acting control chamber, wherein the control chamber of the control device is operatively connected to the actuating device via a first hydraulic actuating line and a second hydraulic actuating line, wherein the actuating piston divides the control chamber into a first control pressure chamber and a second control pressure chamber, and wherein the first control pressure chamber of the control chamber is or can be fluidly connected to the first actuating line and the second control pressure chamber of the control chamber to the second actuating line.

10. The connecting rod according to claim 1, wherein the actuating device comprises an actuating piston arranged in an actuating chamber which is axially displaceable between a first actuating position and a second actuating position, wherein the actuating piston is axially displaceable perpendicular to a longitudinal center plane of a shaft of the connecting rod.

11. The connecting rod according to claim 10, wherein the actuating chamber of the actuating device is designed as a double-acting actuating chamber, wherein the actuating piston preferably divides the actuating chamber into a first actuating pressure chamber and a second actuating pressure chamber, wherein the first actuating pressure chamber is or can be fluidly connected to a first actuating line of the at least one actuating line and the second actuating pressure chamber to a second actuating line of the at least one actuating line.

12. The connecting rod according to claim 1, wherein the connecting rod comprises at least one hydraulic medium supply line, wherein at least one of the actuating lines is in each case fluidly connected to the at least one hydraulic medium supply line so that the actuating line can be supplied with hydraulic medium via said at least one hydraulic medium supply line.

13. The connecting rod according to claim 12, wherein at least one of the actuating lines is fluidly connected to the at least one hydraulic medium supply line via a respective check valve.

14. The connecting rod according to claim 11, wherein the actuating piston divides a control chamber into a first control pressure chamber and a second control pressure chamber, wherein the first control pressure chamber, the first actuating line, and the first actuating pressure chamber form a first hydraulic volume and the second control pressure chamber, the second actuating line, and the second actuating pressure chamber form a second hydraulic volume, wherein the first hydraulic volume and/or the second hydraulic volume are formed as a substantially closed hydraulic volume and are in particular not drained for and/or when switching the control device.

15. The connecting rod according to claim 11, wherein the actuating piston preferably divides a control chamber into a first control pressure chamber and a second control presure chamber, the first control pressure chamber, the first actuating line and the first actuating pressure chamber form a first hydraulic volume and the second control pressure chamber the second actuating line and the second actuating pressure chamber form a second hydraulic volume, and that the first hydraulic volume and/or the second hydraulic volume can be drained, wherein the connecting rod is preferably designed such that either the first hydraulic volume or the second hydraulic volume is drainable.

16. The connecting rod according to claim 15, wherein the actuating device comprises at least one drainage channel for draining the first hydraulic volume and/or for draining the second hydraulic volume, wherein the actuating device designed such that the second hydraulic volume is drained in a first actuating position of the actuating piston and the first hydraulic volume is drained in a second actuating position.

17. The connecting rod according to claim 14, wherein the actuating piston comprises at least one drainage channel wherein the drainage channel is designed to drain hydraulic medium from the first hydraulic volume and/or the second hydraulic volume into a crankcase surrounding the connecting rod when used as intended, wherein the actuating device is designed such that in a first actuating position, the drainage channel is fluidly connected to the second hydraulic volume, and in a second actuating position, the drainage channel is fluidly connected to the first hydraulic volume.

18. The connecting rod according to claim 9, wherein the actuating piston comprises an axial drainage channel which axially extends over an entire length of the actuating piston as well a first and a second radial drainage channel, wherein the radial drainage channels are fluidly connected to the axial drainage channel.

19. The connecting rod according to claim 18, wherein the actuating device comprise an actuation piston arranged in an actuating chamber, the actuation piston dividing the actuating chamber into a first actuating pressure chamber and a second actuating pressure chamber, wherein the first control pressure chamber, the first actuating line, and the first actuating pressure chamber form a first hydraulic volume and the second control pressure chamber, the second actuating line, and the second actuating pressure chamber form a second hydraulic volume, and wherein the actuating device is designed such that in a first actuating position, the second hydraulic volume is fluidly connected to the second radial drainage channel, and in the second actuating position, the first hydraulic volume is fluidly connected to the first radial drainage channel.

20. The connecting rod according to claim 1, wherein the control device and the actuating device are arranged on opposite sides of a connecting rod big end.

21. The connecting rod according to claim 1, wherein the control device is designed in such a manner that the actuating piston releases a first globe valve or a second globe valve, depending on the switching state.

22. A reciprocating piston engine having at least one adjustable-length connecting rod according to claim 1.

23. The reciprocating piston engine according to claim 22, wherein a piston is fixed on the connecting rod by a piston pin.

24. The reciprocating piston engine according to claim 22, wherein the actuating piston is mechanically displaceable in the axial direction by an actuating element fixed in position in the crankshaft housing.

25. A vehicle having a reciprocating piston engine in accordance with claim 22.

\* \* \* \* \*